United States Patent
Umehara

(10) Patent No.: US 9,450,990 B2
(45) Date of Patent: Sep. 20, 2016

(54) TRANSMISSION MANAGEMENT SYSTEM, TRANSMISSION SYSTEM, AND TRANSMISSION MANAGEMENT SYSTEM PROGRAM

(71) Applicant: Naoki Umehara, Kanagawa (JP)

(72) Inventor: Naoki Umehara, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 10 days.

(21) Appl. No.: 14/401,926

(22) PCT Filed: May 20, 2013

(86) PCT No.: PCT/JP2013/064548
§ 371 (c)(1),
(2) Date: Nov. 18, 2014

(87) PCT Pub. No.: WO2013/172484
PCT Pub. Date: Nov. 21, 2013

(65) Prior Publication Data
US 2015/0130890 A1 May 14, 2015

(30) Foreign Application Priority Data
May 18, 2012 (JP) ................ 2012-114607

(51) Int. Cl.
*H04N 7/15* (2006.01)
*H04L 29/06* (2006.01)
(Continued)

(52) U.S. Cl.
CPC ....... *H04L 65/1069* (2013.01); *H04L 12/1818* (2013.01); *H04M 3/00* (2013.01); *H04M 3/56* (2013.01); *H04N 7/15* (2013.01)

(58) Field of Classification Search
CPC .......... H04N 7/15; H04N 7/152; H04N 7/14; H04N 7/141; H04N 7/142; H04M 3/00; H04M 3/56; H04L 12/1818; H04L 65/1069
USPC ............. 348/14.01–14.16; 709/204; 715/753
See application file for complete search history.

(56) References Cited

U.S. PATENT DOCUMENTS

2007/0072637 A1 3/2007 Inoue
2007/0091169 A1* 4/2007 Zhang et al. .............. 348/14.08
(Continued)

FOREIGN PATENT DOCUMENTS

| CN | 101098449 A | 1/2008 |
|---|---|---|
| JP | 2006-229416 | 8/2006 |

(Continued)

OTHER PUBLICATIONS

International Search Report issued on Jun. 25, 2013 in PCT/JP2013/064548 filed on May 20, 2013.
(Continued)

*Primary Examiner* — Melur Ramakrishnaiah
(74) *Attorney, Agent, or Firm* — Oblon, McClelland, Maier & Neustadt, L.L.P

(57) ABSTRACT

A transmission management system receives, when a terminal and a relay device is connected, domain information that indicates a management system capable of executing control associated with start of communication using the relay device. The management system can allow another management system to execute control based on the domain information even if the management system cannot execute the control.

7 Claims, 20 Drawing Sheets

(51) Int. Cl.
*H04M 3/00* (2006.01)
*H04M 3/56* (2006.01)
*H04L 12/18* (2006.01)

(56) References Cited

U.S. PATENT DOCUMENTS

| | | |
|---|---|---|
| 2009/0240770 A1 | 9/2009 | Kalipatnapu et al. |
| 2010/0061538 A1 | 3/2010 | Coleman et al. |
| 2011/0216699 A1 | 9/2011 | Umehara et al. |
| 2012/0221702 A1 | 8/2012 | Umehara et al. |
| 2012/0314019 A1 | 12/2012 | Asai |

FOREIGN PATENT DOCUMENTS

| | | |
|---|---|---|
| JP | 2007-096366 | 4/2007 |
| JP | 2009-219058 | 9/2009 |
| JP | 2010-003273 | 1/2010 |
| JP | 2011-029703 | 2/2011 |
| JP | 2011-199845 | 10/2011 |
| JP | 2012-050063 | 3/2012 |
| WO | WO 2012/014824 A1 | 2/2012 |
| WO | WO 2012014824 A1 * | 2/2012 |

OTHER PUBLICATIONS

Extended European Search Report issued May 13, 2015 in Patent Application No. 13791413.1.

Combined Chinese Office Action and Search Report issued Mar. 8, 2016 in Patent Application No. 201380032370.7 (with English language translation).

* cited by examiner (a) RELAY DEVICE MANAGEMENT TABLE

| RELAY DEVICE ID | PASSWORD |
|---|---|
| 111a@jp.oo.com | xxxx |
| 111b@jp.oo.com | yyyy |

(b) RELAY DEVICE MANAGEMENT TABLE

| RELAY DEVICE ID | PASSWORD |
|---|---|
| 111c@us.oo.com | xyxy |
| 111d@us.oo.com | zyzy |

FIG.9

(a) TERMINAL AUTHENTICATION MANAGEMENT TABLE

| TERMINAL ID/DOMAIN INFORMATION | PASSWORD |
|---|---|
| 01aa@jp.oo.com | aaaa |
| 01ab@jp.oo.com | abab |
| 01ba@jp.oo.com | baba |
| ... | ... |

(b) TERMINAL AUTHENTICATION MANAGEMENT TABLE

| TERMINAL ID/DOMAIN INFORMATION | PASSWORD |
|---|---|
| 01ca@us.oo.com | cccc |
| 01cb@us.oo.com | cdcd |
| 01da@us.oo.com | dcdc |
| ... | ... |

FIG.10

(a) TERMINAL MANAGEMENT TABLE

| TERMINAL ID | DESTINATION NAME | STATE INFORMATION |
|---|---|---|
| 01aa@jp.oo.com | TOKYO OFFICE, AA TERMINAL | None |
| 01ab@jp.oo.com | TOKYO OFFICE, AB TERMINAL | Busy |
| ... | ... | ... |
| 01ba@jp.oo.com | OSAKA OFFICE, BA TERMINAL | Calling |
| 01bb@jp.oo.com | OSAKA OFFICE, BB TERMINAL | Ringing |
| ... | ... | ... |
| 01db@us.oo.com | WASHINGTON DC OFFICE, DB TERMINAL | None |
| ... | ... | ... |

(b) TERMINAL MANAGEMENT TABLE

| TERMINAL ID | DESTINATION NAME | STATE INFORMATION |
|---|---|---|
| 01ca@us.oo.com | NEW YORK OFFICE, CA TERMINAL | None |
| 01cb@us.oo.com | NEW YORK OFFICE, CB TERMINAL | Offline |
| ... | ... | ... |
| 01da@us.oo.com | WASHINGTON DC OFFICE, DA TERMINAL | Accepted |
| 01db@us.oo.com | WASHINGTON DC OFFICE, DB TERMINAL | None |
| ... | ... | ... |
| 01aa@jp.oo.com | TOKYO OFFICE, AA TERMINAL | None |
| ... | ... | ... |

FIG.11

(a) DESTINATION LIST MANAGEMENT TABLE

| TERMINAL ID | |
|---|---|
| REQUESTOR | DESTINATION |
| 01aa@jp.oo.com | 01ab@jp.oo.com<br>01ba@jp.oo.com<br>01ca@us.oo.com<br>01cb@us.oo.com<br>01db@us.oo.com |
| 01ab@jp.oo.com | 01aa@jp.oo.com<br>01ca@us.oo.com<br>01cb@us.oo.com<br>01cc@us.oo.com |
| ... | ... |

(b) DESTINATION LIST MANAGEMENT TABLE

| TERMINAL ID | |
|---|---|
| REQUESTOR | DESTINATION |
| 01ca@us.oo.com | 01aa@jp.oo.com<br>01ba@jp.oo.com<br>01cb@us.oo.com<br>01db@us.oo.com |
| 01cb@us.oo.com | 01aa@jp.oo.com<br>01ca@us.oo.com<br>01cc@us.oo.com |
| ... | ... |

FIG.12

(a) SESSION MANAGEMENT TABLE

| SESSION ID | RELAY DEVICE ID | TERMINAL ID |
|---|---|---|
| se01@jp.oo.com | 111a@jp.oo.com | 01ab@jp.oo.com,01db@us.oo.com |
| se02@jp.oo.com | 111b@jp.oo.com | 01bd@jp.oo.com |
| ... | ... | ... |

(b) SESSION MANAGEMENT TABLE

| SESSION ID | RELAY DEVICE ID | TERMINAL ID |
|---|---|---|
| se51@us.oo.com | 111c@us.oo.com | 01da@us.oo.com,01cc@us.oo.com |
| se52@us.oo.com | 111b@us.oo.com | 01be@us.oo.com |
| ... | ... | ... |

FIG.13

(a) STATE CHANGE MANAGEMENT TABLE (Call, Join, Leave)

| MANAGEMENT INFORMATION | STATE INFORMATION BEFORE CHANGE | STATE INFORMATION AFTER CHANGE |
|---|---|---|
| Call | None | Accepted |
| Join | Accepted | Busy |
| Leave | Busy | None |

(b) STATE CHANGE MANAGEMENT TABLE (Invite, Accepted)

| MANAGEMENT INFORMATION | TERMINAL INFORMATION | STATE INFORMATION BEFORE CHANGE | STATE INFORMATION AFTER CHANGE |
|---|---|---|---|
| Invite | SOURCE | None | Inviting |
| | DESTINATION | None | Invited |
| Ring | DESTINATION | Inviting | Calling |
| | SOURCE | Invited | Ringing |
| Accept | DESTINATION | Calling | Accepted |
| | | Accepted | Accepted |
| | SOURCE | Ringing | Accepted |

FIG.14

RELAY DEVICE SELECTION MANAGEMENT TABLE

| RELAY DEVICE ID | TERMINAL ID | PRIORITY |
|---|---|---|
| 111a@jp.oo.com | 01aa@jp.oo.com | 3 |
| | ... | ... |
| | 01db@us.oo.com | 2 |
| | ... | ... |
| 111b@jp.oo.com | 01aa@jp.oo.com | 1 |
| | ... | ... |
| | 01db@us.oo.com | 1 |
| | ... | ... |
| 111c@us.oo.com | 01aa@jp.oo.com | 1 |
| | ... | ... |
| | 01db@us.oo.com | 2 |
| | ... | ... |
| 111d@us.oo.com | 01aa@jp.oo.com | 1 |
| | ... | ... |
| | 01db@us.oo.com | 4 |
| | ... | ... |

TRANSMISSION MANAGEMENT SYSTEM, TRANSMISSION SYSTEM, AND TRANSMISSION MANAGEMENT SYSTEM PROGRAM

TECHNICAL FIELD

The present invention relates to a transmission management system that receives a request of start of communication between a first transmission terminal and a second transmission terminal when a transmission network between the first transmission terminal and a relay device is connected.

BACKGROUND ART

In recent years, responding to a demand of reduction of expenses and time for business trips, television conference systems have spread as an example of a transmission system that conducts a television conference via a communication network, such as the Internet. In such a television conference system, the various type's of data, for example image data and audio data are transmitted/received between the television conference terminals as an example of transmission terminal to realize the television conference.

Furthermore, in the conventional television conference system, a relay device is used to relay the data transmitted from the television conference terminal to another television conference terminal. In this case, it is known that one relay device is selected from a plurality of candidate relay devices for each television conference in order to disperse a load of the relay device (see Patent Document 1 Japanese Patent Application Laid-Open Publication No. 2012-50063, which is incorporated herein by reference in its entirety). After the selection of a relay device is completed, a transmission management system that manages the television conference terminals controls to connect the television conference terminals with the selected relay device, so that a television conference can be commenced between the television conference terminals. In a case where a new television conference terminal participates in the television conference in execution, the transmission management system controls to connect the television conference terminal newly participating the television conference with a relay device being used in the television conference. Consequently, the television conference terminal newly participating in the television conference can perform transmission/reception of data to/from other television conference terminals that are conducting the television conference via the relay device, so that participating in the television conference is realized.

However, conventionally in a related transmission system, one transmission management system is used to control the start of communication. In a case where a lot of the starts of communication occur at the same time, the single transmission management system should control a plurality of connections between the transmission terminals and the relay devices. As a result, that leads significantly increase of the load applied to the one transmission management system. In a case where a plurality of transmission management systems is provided in order to disperse the loads, a transmission management system cannot recognize that which relay device is used to establish the communication when the communication is started through control by another transmission management system. As a result, when a new transmission terminal participates in the communication, the transmission management system cannot determine that which relay device should be connected to the newly participating transmission terminal. Therefore, the transmission management system cannot execute control associated with communication.

DISCLOSURE OF INVENTION

According to one aspect of the invention, a transmission management system to receive a request of start of communication between a first transmission terminal and a second transmission terminal when the first transmission terminal and a relay device that relays information transmitted from the first transmission terminal are connected via a communication network is provided. The transmission management system includes a reception unit to receive an input of communication control information indicating a transmission management system capable of executing control associated with start of the communication using the relay device; and a control request information transmission unit to transmit control request information indicating a request of the control to another transmission management system capable of executing the control based on the communication control information received by the reception unit.

As described above, according to the present invention, when the first transmission terminal and a relay device is connected, the transmission management system receives communication control information indicating a transmission management system capable of executing control associated with the start of communication using the relay device. Advantageously the transmission management system can allow another transmission management system to execute control based on the communication control information, even if the transmission management system cannot execute the control associated with the start of communication.

BRIEF DESCRIPTION OF DRAWINGS

FIG. 9 is a schematic diagram illustrating a concept of a terminal authentication management table.

FIG. 10 is a schematic diagram illustrating a concept of a terminal management table.

FIG. 11 is a schematic diagram illustrating a concept of a destination list management table.

FIG. 12 is a schematic diagram illustrating a concept of a session management table.

FIG. 13 is a schematic diagram illustrating a concept of a state change management table.

FIG. 14 is a schematic diagram illustrating a concept of a relay device selection management table.

BEST MODE(S) FOR CARRYING OUT THE INVENTION

Overall Configuration of Embodiment

Figure 1:
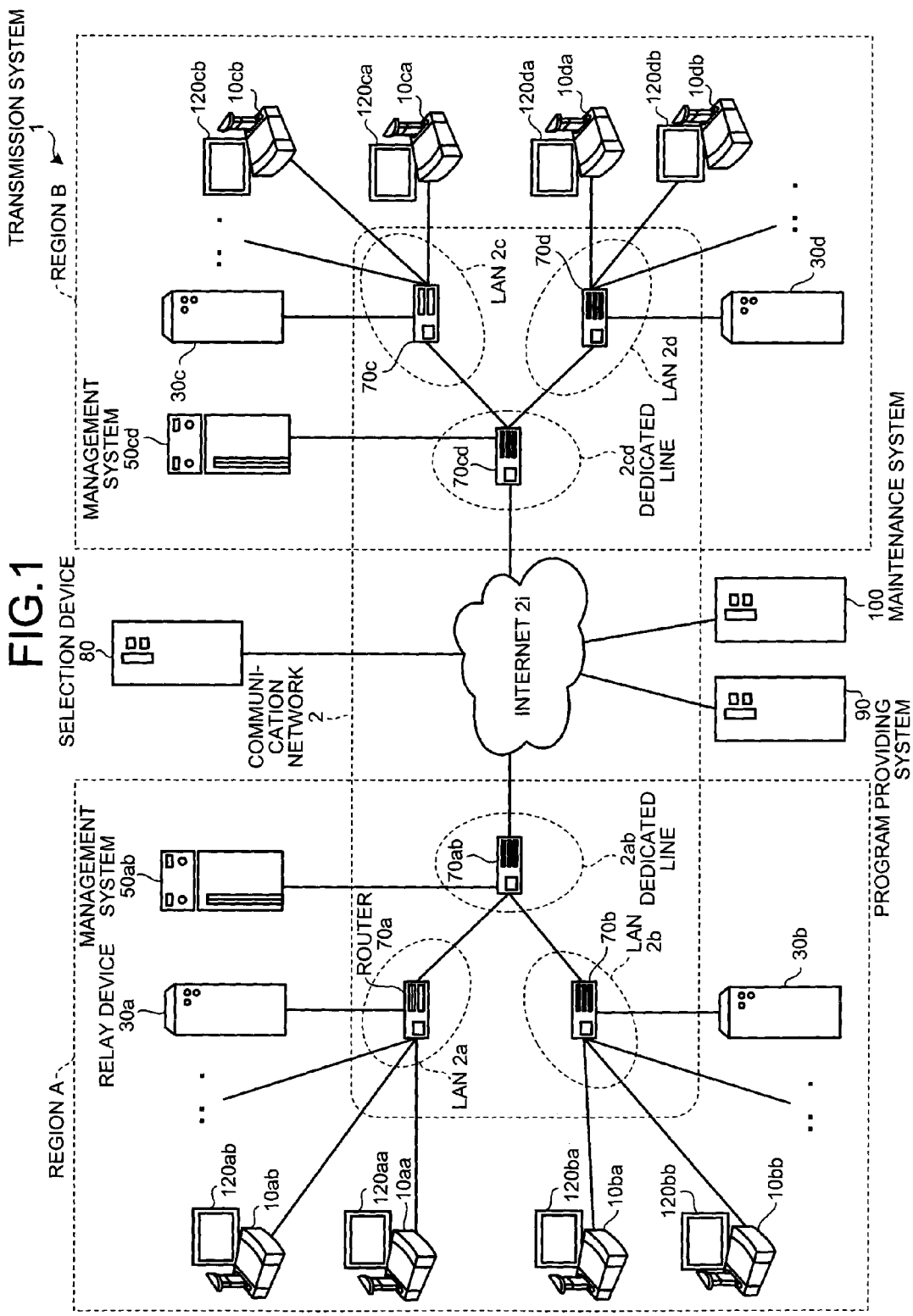
FIG. 1 is a schematic diagram of a transmission system according to an embodiment of the present invention.
Figure 2:
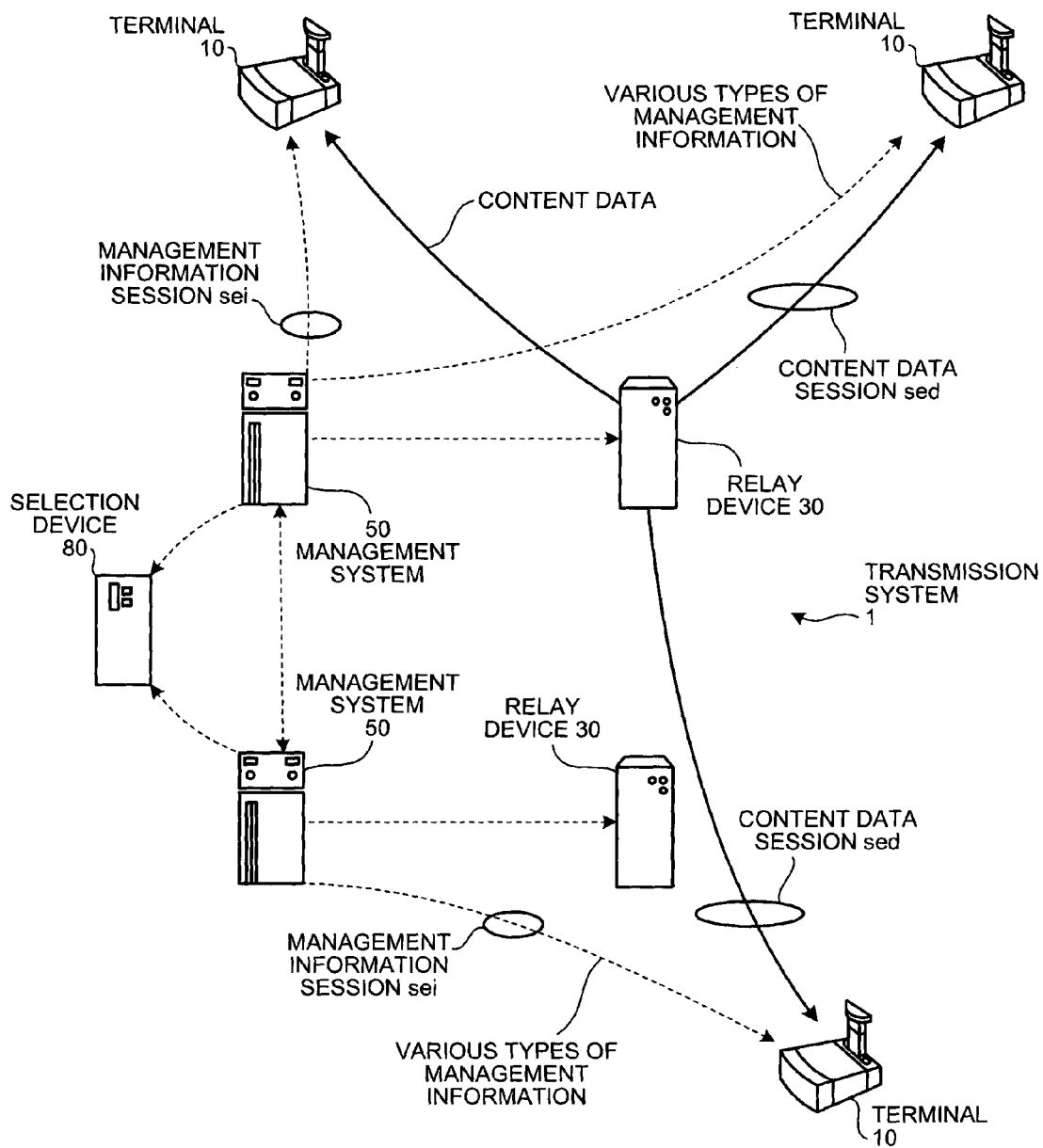
FIG. 2 is a diagram illustrating a transmission system working at transmission/reception of image data, audio data, and various types of management information.

The present invention will be exemplarily described with the following embodiment of the present invention referring to figures associated with the embodiment of the invention. First, an entire configuration of the present embodiment will be described with reference to FIGS. 1 and 2. FIG. 1 schematically shows a transmission system according to the embodiment of the present invention. FIG. 2 schematically shows a concept of a transmission and/or reception state of image data, audio data, and various types of management information through the transmission system.

The transmission system of the embodiment may include a data providing system in which content data is transmitted from one transmission terminal to the other transmission terminal in one-way manner, or a communication system in which information and the like is transmitted/received to/from among a plurality of transmission terminals. This communication system is a system for interactively transmitting information among a plurality of communication terminals (corresponding to "transmission terminals") via a communication management system (corresponding to a "transmission management system"), and examples of the system include a television conference system, a videophone system, an audio teleconference, a voice telephony system, and a personal computer (PC) screen sharing system, but are not limited thereto.

In the embodiment, a transmission system, a transmission management system, and a transmission terminal will be described on the basis of a television conference system as an example of the communication system, a television conference management system as an example of the communication management system, and a television conference terminal as an example of the communication terminal. That is, the transmission terminal and the transmission manage- ment system of the embodiment are not only applied to a television conference system, but also to a communication system and a transmission system.

A transmission system 1 illustrated in FIG. 1 consists of a plurality of transmission terminals (10$aa$, 10$ab$, ... ), displays (120$aa$, 120$ab$, ... ) for each transmission terminal (10$aa$, 10$ab$, ... ), a plurality of relay devices (30$a$, 30$b$, 30$c$, and 30$d$), a plurality of transmission management systems (50$ab$, 50$cd$), a relay device selection device 80, a program providing system 90, and a maintenance system 100. A plurality of transmission terminals 10 perform transmission/ reception of image data and audio data, which are examples of the content data. Note that an image of the image data may be a video image or a still image, and may be both of a video image and a still image. In the embodiment, a video image as an example of the image data will be described.

Note that, hereinafter, the "transmission terminal" is simply referred to as "terminal", the "transmission management system" is simply referred to as a "management system", and the "relay device selection device" is simply referred to as a "selection device." Furthermore, any management system from among the plurality of management systems (50$ab$ and 50$cd$) is referred to as a "management system 50", any terminal from among the plurality of terminals (10$aa$, 10$ab$, ... ) is referred to as a "terminal 10", any display from among the plurality of displays (120$aa$, 120$ab$, ... ) is referred to as a "display 120", and any relay device from among the plurality of relay devices (30$a$, 30$b$, 30$c$, and 30$d$) is referred to as a "relay device 30."

As illustrated in FIG. 2, a management information session sei for performing transmission/reception of various types of management information via the management system 50 is established between the terminals 10 in the transmission system 1. Furthermore, a session for performing transmission/reception of image data and audio data via the relay device 30 is established between the terminals 10. Here, the session for performing transmission/reception of image data and audio data is illustrated as content data session sed in a comprehensive manner.

The terminal 10 illustrated in FIG. 1 performs transmission/reception of content data, for example image data and audio data, to communicate with other terminals 10. That is, the communication in the embodiment includes the transmission/reception of image data as well as that of audio data. Alternatively, the terminal 10 may only perform the transmission/reception of audio data not image data. The relay device 30 selected from among the plurality of relay devices 30 by the selection device 80 relays the content data to the terminals 10.

A plurality of routers (70$a$, 70$b$, 70$c$, 70$d$, 70$ab$, and 70$cd$) select an optimal route for the content data. Note that, hereinafter, any router from among the routers (70$a$, 70$b$, 70$c$, 70$d$, 70$ab$, and 70$cd$) is referred to as a "router 70."

The program providing system 90 includes a hard disk (HD) 204 described below, in which a terminal program for causing the terminal 10 to realize the various functions (or, causing the terminal 10 to function as various means) is stored, and is capable of transmitting the terminal program to the terminal 10. The HD 204 of the program providing system 90 stores a relay device program for causing the relay device 30 to realize the various functions (or, causing the relay device 30 to function as various means), and the program providing system 90 is capable of transmitting the relay device program to the relay device 30. The HD 204 of the program providing system 90 stores a selection device program for causing the selection device 80 to realize the various functions (or, causing the selection device 80 to function as various means), and the program providing system 90 is capable of transmitting the selection device program to the selection device 80. The HD 204 of the program providing system 90 stores a maintenance system program for causing the maintenance system 100 to realize the various functions (or, causing the maintenance system 100 to function as various means), and is capable of transmitting the maintenance system 100 to the maintenance system program.

The maintenance system 100 is a computer that performs maintenance, management, and repair of at least one of the terminal 10, the relay device 30, the management system 50, the selection device 80, and the program providing system 90. For example, in a case where the maintenance system 100 is domestically disposed, and the terminal 10, the relay device 30, the management system 50, the selection device 80, and the program providing system 90 are internationally disposed, the maintenance system 100 remotely performs maintenance, management, and repair of at least one of the terminal 10, the relay device 30, the management system 50, the selection device 80, and the program providing system 90 via the communication network 2. The maintenance system 100 may perform maintenance or management of a model number, a serial number, a customer, inspection, and a trouble history of at least one of the terminal 10, the relay device 30, the management system 50, the selection device 80, and the program providing system 90, not via the communication network 2.

By the way, the terminals (10aa, 10ab, . . . ), the relay device 30a, and the router 70a are connected by the LAN 2a so that they are able to communicate with each other. The terminals (10ba, 10bb, . . . ), the relay device 30b, and the router 70b are connected by the LAN 2b so that they can communicate with each other. The management system 50ab, the LAN 2a and the LAN 2b are connected by a leased line 2ab including the router 70ab so that they can communicate with each other, and are built in a predetermined region A. For example, the region A may be Japan, the LAN 2a may be built in a Tokyo office, and the LAN 2b may be built in an Osaka office. The management system 50ab manages the state of the terminal (10aa, 10ab, 10ba, 10bb, . . . ) connected to the LAN 2a or the LAN 2b, and controls connections between the terminals 10 by using the relay devices (30a and 30b).

Meanwhile, the terminals (10ca, 10cb, . . . ), the relay device 30c, and the router 70c are connected by the LAN 2c so that they can communicate with each other. The terminals (10da, 10db, . . . ), the relay device 30d, and the router 70d are connected by the LAN 2d so that they can communicate with each other. The management system 50cd, the LAN 2c, and the LAN 2d are connected by a leased line 2cd including the router 70cd so that they can communicate with each other, and are built in a predetermined region B. For example, the region B may be the United States of America, the LAN 2c is built in a New York office, and the LAN 2d is built in Washington D.C. office. The region A is connected to the Internet 2i through the router 70ab and the region B is also connected to the Internet 2i through the router 70cd, so that the region A and the region B can communicate with each other. The management system 50cd manages the states of the terminals (10ca, 10cb, . . . 10da, 10db, . . . ) connected to the LAN 2c or the LAN 2d, and controls connection between the terminals 10 by using the relay devices (30c and 30d).

In addition, the selection device 80, the program providing system 90, and the maintenance system 100 are connected with the terminals 10, the relay devices 30, and the management systems 50 via the Internet 2i so that they can communicate with each other. The selection device 80, the program providing system 90, and the maintenance system 100 may be disposed in the region A or the region B, or may be disposed in any region other than these regions.

Note that, in the embodiment, the communication network 2 of the embodiment is built by the LAN 2a, the LAN 2b, the leased line 2ab, the Internet 2i, the leased line 2cd, the LAN 2c, and the LAN 2d. This communication network 2 may include communication portions in which not only wired communication but also wireless communication by Wireless Fidelity (WiFi), Bluetooth (registered trademark), and the like is performed.

Note that each terminal 10 may be used for communication not only among a plurality of offices and between different rooms within the same office, but also within the same room, and between the outdoors and the indoors or between the outdoors and the outdoors. In a case where each terminal 10 is used outdoors, wireless communication using a mobile phone communication network, and the like may be performed.

Hardware Configuration of Embodiment

Figure 3:
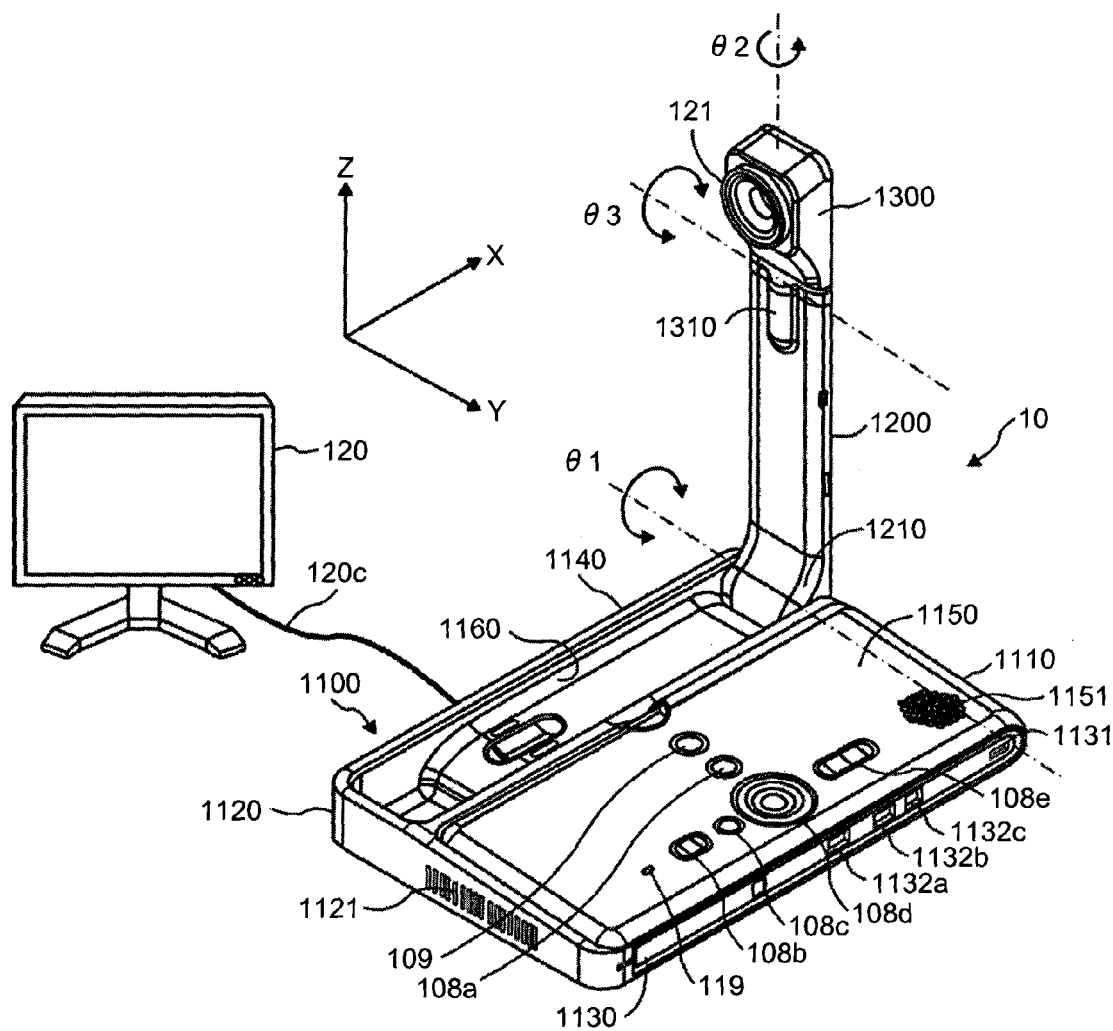
FIG. 3 is a perspective view of a terminal according to the embodiment of the present invention.
Figure 4:
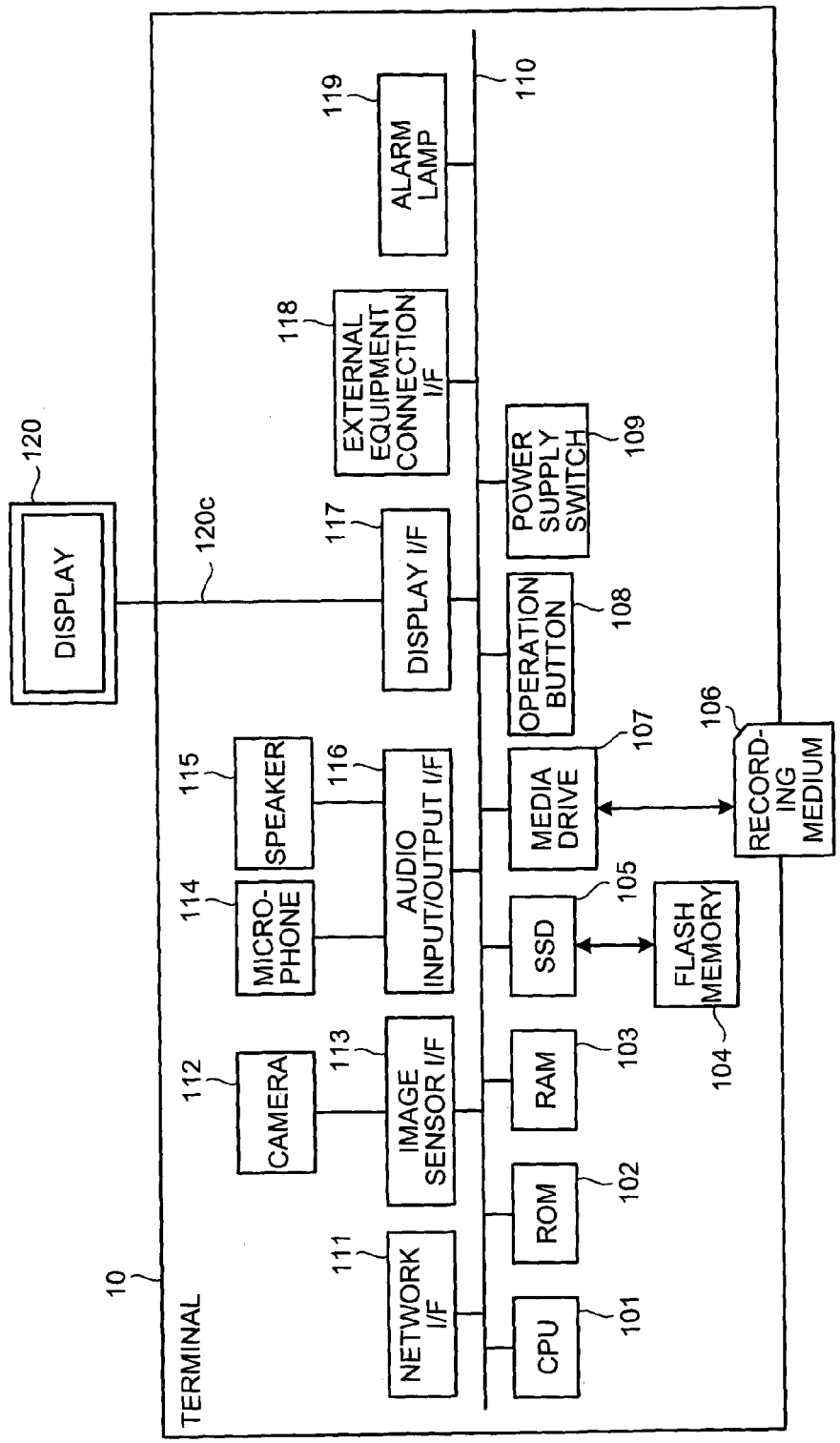
FIG. 4 is a schematic diagram illustrating hardware configuration of the terminal according to the embodiment of the present invention.

Next, a hardware configuration of the embodiment will be described. First, a hardware configuration of the terminal 10 will be described with reference to FIG. 3 and FIG. 4. FIG. 3 shows an appearance of the terminal according to the embodiment of the present invention. FIG. 4 shows a hardware configuration of the terminal according to the embodiment of the present invention. Note that hereinafter, the longitudinal direction of the terminal 10 is referred to as an X-axis direction, a direction perpendicular to the X-axis direction in a horizontal surface is referred to as a Y-axis direction, and a direction perpendicular to the X-axis direction and the Y-axis direction (vertical direction) is referred to as a Z-axis direction.

As illustrated in FIG. 3, the terminal 10 includes a housing 1100, an arm 1200, and a camera housing 1300. An inlet plane (not shown) in which a plurality of inlet holes are formed is provided in a front-side wall plane 1110 of the housing 1100, and an outlet plane 1121 in which a plurality of outlet holes are formed is provided in a rear-side wall plane 1120 of the housing 1100. With this structure, ambient air can be introduced into the terminal 10 from a front of the terminal through an inlet plane (not shown), and discharged to a rear of the terminal through the outlet plane 1121, by driving a cooling fan built in the housing 1100. A sound pickup hole 1131 is formed in a right-side wall plane 1130 of the housing 1100, and a sound like a voice, an audio, and a noise, can be picked up by a built-in microphone 114 described below.

An operation panel 1150 is formed on a surface of the housing 1100 at a side of the right-side wall plane 1130. This operation panel 1150 is provided with a plurality of operation buttons (108a to 108e), a power supply switch 109, and an alarm lamp 119 described below, and a sound output 1151 is formed with a plurality of audio output holes for allowing the audio output from a built-in speaker 115 to pass through. Also, a housing unit 1160 with a recess for resting the arm 1200 and the camera housing 1300 is formed on the surface of the housing 1140 at a side of a left-side wall plane 1140. A plurality of connection ports (1132a to 1132c) for electrically connecting a cable to an external equipment connection I/F 118 described below are provided on the right-side wall plane 1130 of the housing 1100. On the other hand, a connection port (not shown) for electrically connecting a cable 120c for a display 120 to the external equipment connection I/F 118 described below is provided on the left-side wall plane 1140 of the housing 1100.

Note that, hereinafter, any operation button from among the operation buttons (108a to 108e) the operation buttons (108a to 108e) is referred to as an "operation button 108", and any connection port from among the connection ports (1132a to 1132c) is referred to as a "connection port 1132."

Next, the arm 1200 is attached to the housing 1100 with a torque hinge 1210, so that the arm 1200 is rotatable up and down within a range of a tilt angle θ1 of 135 degrees relative to the housing 1100. FIG. 3 illustrates a state of the tilt angle θ1 of 90 degrees.

A built-in camera 121 described below is provided inside the camera housing 1300, and can take an image of a user, a document, a room, and the like. Also, a torque hinge 1310 is formed inside the camera housing 1300. The camera housing 1300 is attached to the arm 1200 with the torque hinge 1310. The camera housing 1300 is attached to the arm 1200 with the torque hinge 1310, so that the camera housing 1300 is rotatable up and down and right and left within a range of a pan angle θ2 of ±180 degrees and of a tilt angle θ3 of ±45 degrees relative to the arm 1200, if an angle of the arm illustrated in FIG. 3 is defined as 0 degrees.

As illustrated in FIG. 4, the terminal 10 of the embodiment includes a central processing unit (CPU) 101 that controls an operation of the entire terminal 10, a read only memory (ROM) 102 that stores the terminal program, a random access memory (RAM) 103 used as a work area of the CPU 101, a flash memory 104 that stores various types of data, for example image data and/or audio data, a solid state drive (SSD) 105 that controls reading/writing of various types of data for the flash memory 104 according to instructions from the CPU 101, a media drive 107 that controls reading/writing (storing) of data for a recording medium 106, for example a flash memory, an operation button 108 operated when a destination of the terminal 10 is selected, a power supply switch 109 for turning ON/OFF of a power supply of the terminal 10, and a network I/F (interface) 111 for data transmission via the communication network 2 described below.

The terminal 10 includes the built-in camera 121 that obtains image data by taking an image of a subject according to instructions from the CPU 101, an image sensor I/F 113 to control driving of the camera 121, a built-in microphone 114 to receive a voice and audio, a built-in speaker 115 to output a voice and audio, an audio input/output I/F 116 to process input/output of an audio signal between the microphone 114 and the speaker 115 according to instructions from the CPU 101, a display I/F 117 to transmit image data to the external display 120 according to instructions from the CPU 101, an external equipment connection I/F 118 to connect the terminal 10 with various types of external equipment, an alarm lamp 119 to alert an error of the various functions of the terminal 10, and a bus line 110, for example an address bus and a data bus, to electrically connect the above-described elements each other, as illustrated in FIG. 4.

The display 120 is a display unit made of a liquid crystal or an organic EL, which displays an image of the subject, an operation icon, and the like. Also, the display 120 is connected to the display I/F 117 through a cable 120c. The cable 120c may be one of a cable for an analog RGB (VGA) signal, a cable for a component video, and a cable for a high-definition multimedia interface (HDMI) or for a digital video interactive (DVI) signal.

The camera 121 includes a lens and a solid-state image sensor that converts light into an electric charge to electronically process the image (video) of the subject. As the solid-state image sensor, a charge coupled device (CCD), the complementary metal oxide semiconductor (CMOS), and the like may be available.

Each of external equipments, for example an external camera, an external microphone, and an external speaker, is capable of electrically connected with the external equipment connection I/F 118 through a universal serial bus (USB) cable inserted into the connection port 1132 of the housing 1100 illustrated in FIG. 3. In a case where the external camera is connected, the external camera is driven in priority to the built-in camera 121 according to instructions from the CPU 101. Similarly, in a case where external microphone is connected or the external speaker is connected, the external microphone or the external speaker is driven in priority to the built-in microphone 114 or the built-in speaker 115 according to instructions from the CPU 101.

Note that the recording medium 106 is configured to be detachable to the terminal 10. Not limited to the flash memory 104, as long as nonvolatile memory that performs reading/writing of data according to instructions from the CPU 101, electrically erasable and programmable ROM (EEPROM) and the like may be used.

A computer-readable recording medium (recording medium 106, and the like), in which a terminal program file is recorded thereon with an installable or executable format, may be distributed. Also, the terminal program may be stored in the ROM 102 instead of the flash memory 104. Note that the embodiment of the terminal 10 has been described referring to FIGS. 3 and 4, of the invention but the terminal of the invention is not limited to the embodiment. For example, the appearance and the hardware may be a typical desktop or notebook personal computer. In this case, the camera and the microphone may not be necessarily built in the terminal and may be externally equipped with the terminal.

Figure 5:
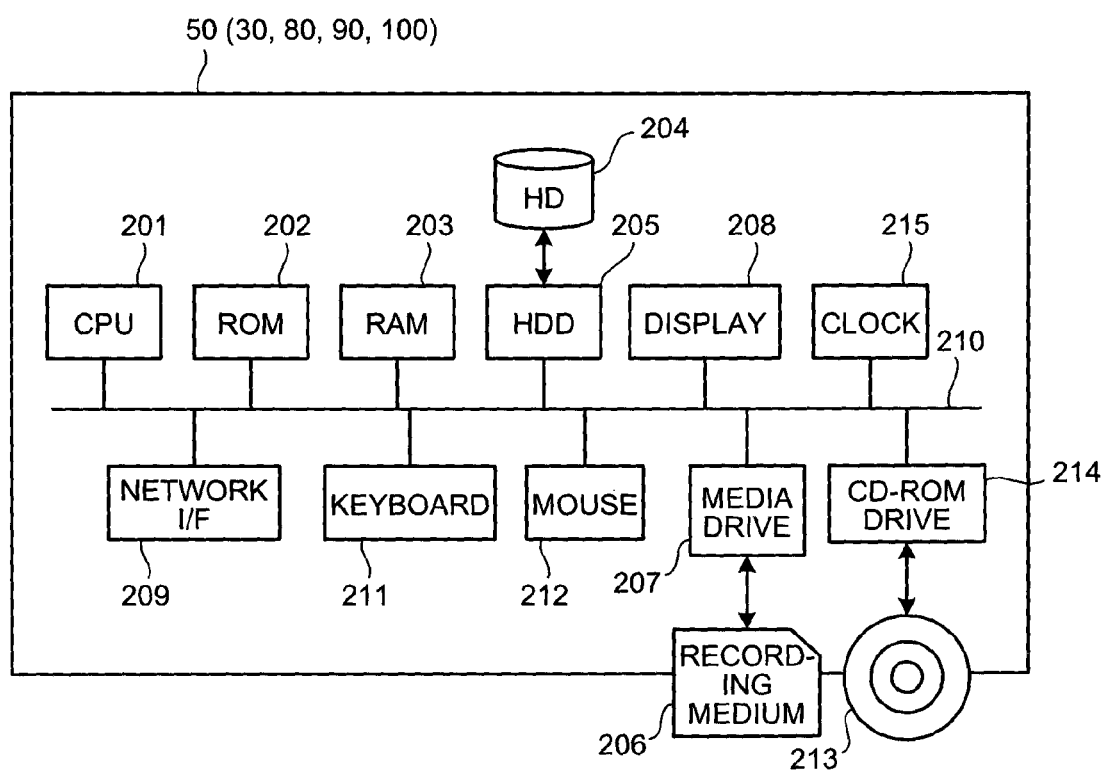
FIG. 5 is a schematic diagram of a hardware configuration of a management system according to an embodiment of the present invention.

Next, hardware configurations of the management system 50, the relay device 30, the selection device 80, the program providing system 90, and the maintenance system 100 will be described with reference to FIG. 5. FIG. 5 is a hardware configuration diagram of a management system according to an embodiment of the present invention. Note that the relay device 30, the management system 50, the selection device 80, the program providing system 90, and the maintenance system 100 respectively have the same appearance as a typical server/computer. Therefore, description of the appearance is omitted.

The management system 50 includes a CPU 201 that controls an operation of the entire management system 50, a ROM 202 that stores a program to drive the CPU 201, for example an initial program loader (IPL), a RAM 203 used as a work area of the CPU 201, an HD 204 that stores various types of data, for example a transmission management program, a hard disk drive (HDD) 205 that controls reading/writing of various types of data from/to the HD 204 according to instructions from the CPU 201, a media drive 207 that controls reading/writing (storing) of data from/to the recording media 206 for example flash memory, a display 208 that displays various types of information, for example a cursor, a menu, a window, a character, and an image, a network I/F 209 to transmit data via the communication network 2, a keyboard 211 including a plurality of keys to input a character, a numerical value, various instructions, and the like, a mouse 212 that selects/executes various instructions, selects an object to be processed, moves the cursor, and the like, a CD-ROM drive 214 that controls reading/writing of various types of data from/to the detachable recording medium, for example a compact disc read only memory (CD-ROM) 213, a clock 215 as a built-in clock of the management system 50, and a bus line 210, for example an address bus and a data bus for electrically connecting the elements with each other as illustrated in FIG. 5.

Note that a computer-readable recording medium, for example the recording medium 206 and the CD-ROM 213, in which the above-described transmission management program file is recorded thereon with an installable or executable format, may be distributed. Alternatively, the above-described transmission management program may be stored in the ROM 202 instead of the HD 204.

The relay device 30, the selection device 80, the program providing system 90, and the maintenance system 100 include a hardware configuration similar to the above-described management system 50, and therefore, detailed descriptions thereof are omitted. However, a relay device program, a selection device program, a program-providing program, and a maintenance program for controlling the relay device 30, the selection device 80, the program providing system 90, or the maintenance system 100 are recorded in the HD 204. Even in this case, a computer-readable recording medium, for example the above-described recording medium 206 and CD-ROM 213, in which the program files are recorded thereon with an installable or executable format may be distributed. Alternatively, the above-described programs may be stored in the ROM 202 instead of the HD 204. Note that as other examples of the above-described detachable recording medium, a computer-readable recording medium, for example a compact disk drive (CD-R), a digital versatile disk (DVD), and a blue-ray disk, in which the program files are recorded thereon, may be distributed.

Functional Configuration of Embodiment

Figure 6:
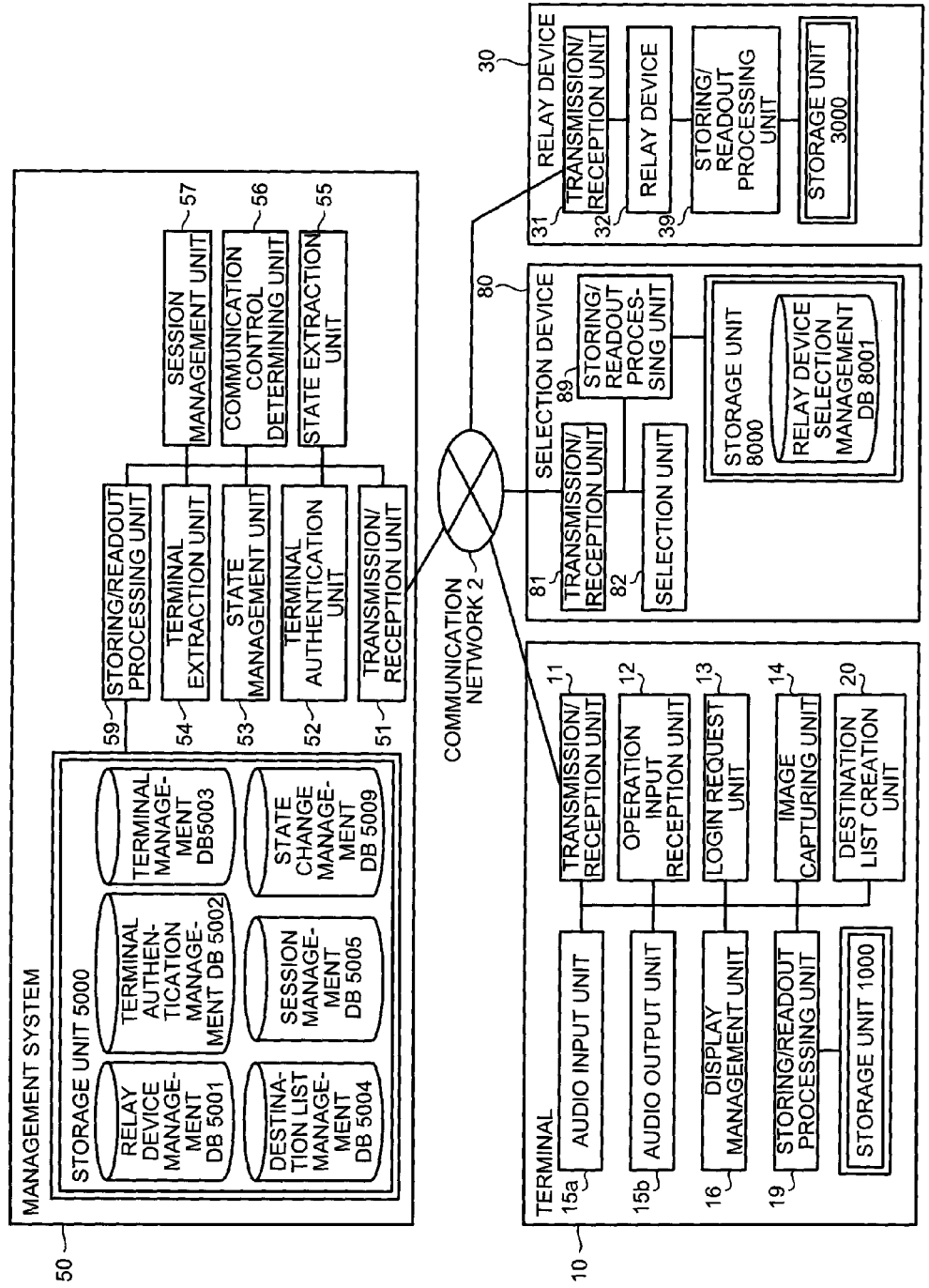
FIG. 6 is a function block diagram of the transmission system including a terminal, device, and system, according to the embodiment of the present invention.

Next, a functional configuration of the embodiment will be described with reference to FIG. 6. FIG. 6 is a function block diagram of the terminal, device, and system that configure the transmission system according to the embodiment of the present invention. In FIG. 6, the terminal 10, the relay device 30, and the management system 50 are connected via a communication network 2 so that they can communicate with each other. Here, the program providing system 90 and the maintenance system 100 illustrated in FIG. 1 are omitted from FIG. 6 because they are directly associated with a television conference communication.

<Functional Configuration of Terminal>

Figures 7, 8:
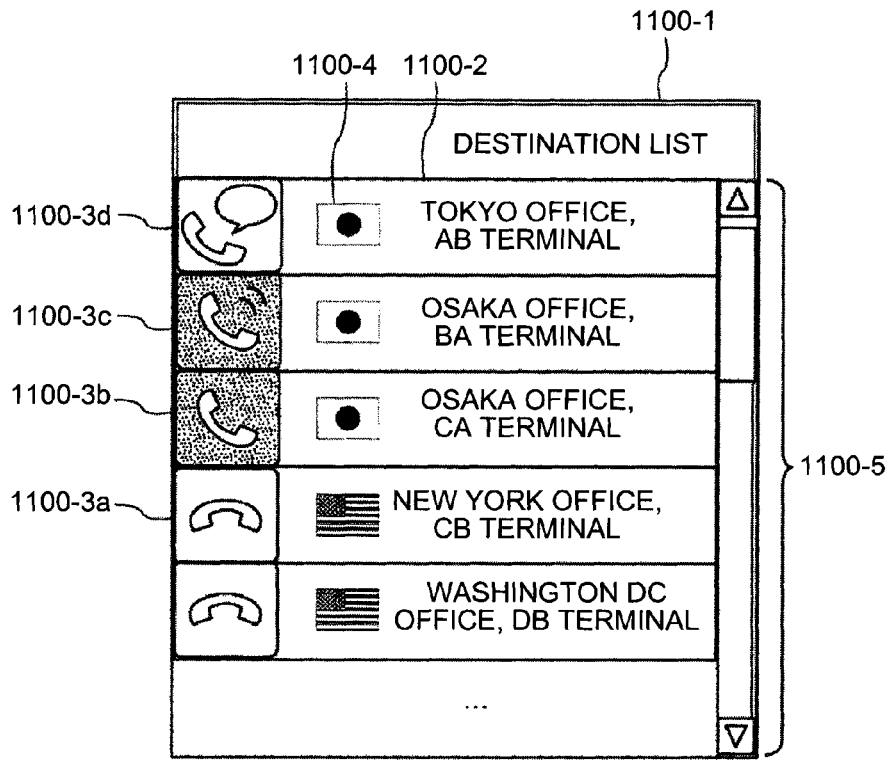
FIG. 7 is a schematic diagram illustrating a concept of a destination list.
FIG. 8 is a schematic diagram illustrating a concept of a relay device management table.

The terminal 10 includes a transmission/reception unit 11, an operation input reception unit 12, a login request unit 13, an image capturing unit 14, an audio input unit 15a, an audio output unit 15b, a display management unit 16, a storing/readout processing unit 19, and a destination list creation unit 20. These units are configured as the functions or means to function to be realized by operation of any one of the configuration elements illustrated in FIG. 4 according to instructions from the CPU 101 in response to a terminal program read from the flash memory 104 and developed on the RAM 103. Further, the terminal 10 includes a storage unit 1000 built by the RAM 103 illustrated in FIG. 4 and the flash memory 104 illustrated in FIG. 4. The storage unit 1000 stores a destination list box 1100-1 illustrated in FIG. 7. Note that FIG. 7 shows a concept of a destination list.

(Functional Units of Terminal)

Next, functional configurations of the terminal 10 will be described with reference to FIGS. 4 and 6. Note that, hereinafter, in describing the function of each element of the terminal 10, a relation between the function of each element and the main elements for realizing the function of each element of the terminal 10 illustrated in FIG. 4 will also be described.

The transmission/reception unit 11 is realized by instructions from the CPU 101 illustrated in FIG. 4 and by the network I/F 111 illustrated in FIG. 4, and performs transmission/reception of various types of data (or information) with other terminal, device, or system via the communication network 2. The transmission/reception unit 11 starts receiving state information that indicates the state of the terminal 10 to be a destination candidate from the management system 50 prior to starting communication with other terminals 10. Note that this state information indicates an operating state of each terminal 10 (online or offline, in a meeting even online, and the like). Also, this state information indicates not only the operating state of each terminal 10, but also various states, for example the cable 120c being off, an audio being output only without an image, the audio output being suspended (MUTE), and the like, in the terminal 10. Hereinafter, an example in which the state information indicates an operating state is described.

The operation input reception unit 12 is realized according to instructions from the CPU 101, an operation button 108 and a power supply switch 109 illustrated in FIG. 4. A user can input various inputs through the operation input reception unit 12. For example, when the user turns ON the power supply switch 109 illustrated in FIG. 4, the operation input reception unit 12 illustrated in FIG. 6 turns ON the power supply responding to the power supply ON.

The login request unit 13 is realized according to instructions from the CPU 101 illustrated in FIG. 4. The login request unit 13 automatically transmits login request information that indicates a request of login from the transmission/reception unit 11 to the management system 50 via the communication network 2 upon receiving the above-described turning ON of the power supply. When the user turns OFF the power supply switch 109, the transmission/reception unit 11 transmits state information that indicates turning OFF of the power supply to the management system 50, and then the operation input reception unit 12 turns OFF the power supply completely. Consequently, the management system 50 can recognize that the terminal 10 has turned from power ON to power OFF. Note that, in the present embodiment, the terminals (10aa, 10ab, 10ba, 10bb, . . . ) on the LANs (2a and 2b) are connected with the management system 50ab, and the terminals (10ca, 10cb, 10da, 10db, . . . ) on the LANs (2c and 2d) are connected with the management system 50cd.

The image capturing unit 14 is realized according to instructions from the CPU 101 illustrated in FIG. 4, the camera 121 and the image sensor I/F 113 illustrated in FIG. 4. The image capturing unit 14 takes an image of a subject, and outputs image data of the subject.

The audio input unit 15a is realized according to instructions from the CPU 101 illustrated in FIG. 4 and the audio input/output I/F 116 illustrated in FIG. 4. After user's voice is converted into an audio signal by the microphone 114, the audio input unit 15a inputs audio data associated with the audio signal. The audio output unit 15b is realized according to instructions from the CPU 101 and by the audio input/output I/F 116 illustrated in FIG. 4. The audio output unit 15b outputs to the speaker 115 the audio signal associated with the audio data, and outputs an audio from the speaker 115.

The display management unit 16 is realized according to instructions from the CPU 101 and by the display I/F 117 illustrated in FIG. 4. The display management unit 16 controls transmission of received image data to the display 120.

The display management unit 16 also displays a destination list including destination names to the display 120 based on information received from the management system 50. For example, the destination list box 1100-1 illustrated in FIG. 7 is displayed on the display 120 by the display management unit 16. On the destination list box 1100-1, destination names 1100-2, for example "Tokyo office, AB terminal", icons (1100-3a, 1100-3b, 1100-3c, 1100-3d) that indicate states of the terminals 10 of respective destination names, and an icon 1100-4 that indicates a region are displayed on the display 120. Among them, the icon 1100-3a indicates that communication with this terminal is not possible because a terminal, which is one of the destination candidates, is an OFF line (hereinafter, this state is referred to as "Offline"), and that communication with this terminal is not possible. The icon 1100-3b indicates that the terminal 10, which is one of the destination candidates, is ready prior to starting communication (hereinafter, this state is referred to as "None"). The icon 1100-3c indicates that the terminal 10, which is one of the destination candidates, is requesting communication with other terminals (hereinafter, this state is referred to as "Calling"), or requested communication from other terminals 10 (hereinafter, this state is referred to as "Ringing"). The icon 1100-3d indicates that the terminal, has accepted the request (hereinafter, this state of the terminal 10 is referred to as "Accepted"), or that the terminal 10, which is one of the destination candidates, is communicating with other terminals 10 (hereinafter, this state is referred to as "Busy"). Also, a scroll bar 1100-5 is displayed at a right side in the destination list box 1100-1. An upward-pointing triangular icon and a downward-pointing triangular icon are displayed in the scroll bar, by selecting either icon, destination name of the destination candidate that has not been displayed and an icon that indicates a state thereof are displayed.

The storing/readout processing unit 19 is realized according to instructions from the CPU 101 and by the SSD 105 illustrated in FIG. 4, or according to instructions from the CPU 101. The storing/readout processing unit 19 stores various types of data in the storage unit 1000 and reads out various types of data stored in the storage unit 1000. The storage unit 1000 stores a terminal identification (ID) for identifying the terminal 10, a password, and the like. In addition, the storage unit 1000 is overwritten with image data and audio data received in communicating with a destination terminal every time the data is received. Among the data, an image is displayed on the display 120 with image data prior to being overwritten, and an audio is output from the speaker 115 with audio data prior to being overwritten. Note that each IDs, for example the terminal ID in the embodiment, indicate identification information including a language, a character, a sign, and various symbols, for uniquely identifying the terminal 10 and the like. Also, the IDs may be identification information consisting of a combination of at least two from the language, the character, the sign, and the various symbols, described above.

The destination list creation unit 20 creates and updates the destination list in which the state of the terminal 10 of the destination candidate is illustrated by the icon as illustrated in FIG. 7 based on information received from the management system 50.

<Functional Configuration of Relay Device>

The relay device 30 includes a transmission/reception unit 31, a relay device 32, and a storing/readout processing unit 39. These units are configured as the functions or means to function to be realized by operation of any of the configuration elements illustrated in FIG. 5 according to instructions from the CPU 201 in response to a relay device program read from HD 204 and developed on the RAM 203. The relay device 30 includes a storage unit 3000 built by the RAM 203 illustrated in FIG. 5 or the HD 204 illustrated in FIG. 5, and the like.

(Functional Units of Relay Device)

Next, functional configurations of the relay device 30 will be described. Note that, hereinafter, in describing the function of the relay device 30, a relation between the function and main elements for realizing the function of the relay device 30 from among the configuration elements illustrated in FIG. 5 will also be described.

The transmission/reception unit 31 of the relay device 30 illustrated in FIG. 6 is realized according to instructions from the CPU 201 and by the network I/F 209 illustrated in FIG. 5. The transmission/reception unit 31 performs transmission/reception of various types of data (or information) to/from other terminal, device, or system via the communication network 2. The relay device 32 is realized according to instructions from the CPU 201 illustrated in FIG. 5. The relay device 32 relays content data transmitted/received between the terminals 10 in the content data session sed via the transmission/reception unit 31. The storing/readout processing unit 39 is realized according to instructions from the CPU 201 and by the HDD 205 illustrated in FIG. 5. The storing/readout processing unit 39 stores the various types of data in the storage unit 3000 and reads out the various types of data stored in the storage unit 3000.

<Functional Configuration of Management System>

The management system 50 includes a transmission/reception unit 51, a terminal authentication unit 52, a state management unit 53, a terminal extraction unit 54, a state extraction unit 55, a communication control determining unit 56, a session management unit 57, and a storing/readout processing unit 59. These units are configured as the functions or means to function to be realized by operation of any one of the configuration elements illustrated in FIG. 5 according to instructions from the CPU 201 in response to a management system program read from the HD 204 and developed on the RAM 203. Also, the management system 50 includes a storage unit 5000 built by the HD 204 illustrated in FIG. 5.

(Relay Device Management Table)

A relay device management DB 5001 configured from a relay device management table illustrated in FIG. 8 is built in the storage unit 5000. Note that FIG. 8(a) shows a concept of a relay device management table managed in the management system 50ab, and FIG. 8(b) shows a concept of a relay device management table managed in the management system 50cd. The own management system 50 can control the connection of each relay device 30. The relay device ID of each relay device 30 and a password associated with each relay device ID are managed in the relay device management table. For example, a password for connecting to the relay device 30a identified by a relay device ID of "111a@jp.oo.com" is "xxxx" in the relay device management table illustrated in FIG. 8(a). In the present embodiment, the relay device ID includes domain information (communication control information) for example "jp.oo-.com", which indicates that the management system 50 can control the start or termination of communication using the relay device 30 identified by the relay device ID. Note that, hereinafter, the relay device ID is referred to as simply "111a" by omitting the domain information of "jp.oo.com", if there are no explicit reasons.

(Terminal Authentication Management Table)

A terminal authentication management DB 5002 configured from a terminal authentication management table illustrated in FIG. 9 is built in the storage unit 5000. Note that FIG. 9(*a*) shows a concept of a terminal authentication management table managed in the management system 50*ab*, and FIG. 9(*b*) shows a concept of a terminal authentication management table managed in the management system 50*cd*. The terminal ID assigned to all terminals 10 and a password associated with each terminal ID of all terminals 10 connected to the own management system 50 are managed in, the terminal authentication management table. For example, the terminal ID of the terminal 10*aa* is "01aa@jp.oo.com", and the password is "aaaa" in the terminal authentication management table illustrated in FIG. 9(*a*). In the present embodiment, the terminal ID includes domain information (terminal connection information) for example "jp.oo.com", which indicates that the terminal 10 identified by the terminal ID is connected with the management system 50. Note that, hereinafter, the terminal ID is referred to as simply "01aa" by omitting the domain information of "jp.oo.com", if there are no explicit reasons.

(Terminal Management Table)

Further, a terminal management DB 5003 configured from a terminal management table as an example of a state management unit illustrated in FIG. 10 is built in the storage unit 5000. Note that FIG. 10(*a*) is a conceptual diagram illustrating a terminal management table managed in the management system 50*ab*, and FIG. 10(*b*) is a conceptual diagram illustrating a terminal management table managed in the management system 50*cd*. In the terminal management table, a destination name when the terminals 10 are destinations and the state information of the terminals 10 are associated with each other and managed for each terminal ID of the terminals 10. For example, in the terminal management table illustrated in FIG. 10, the terminal 10*aa* having the terminal ID of "01aa" has the destination name of "Tokyo office AA terminal" and the operating state of "None".

(Destination List Management Table)

A destination list management DB 5004 configured from a destination list management table illustrated in FIG. 11 is built in the storage unit 5000. Note that FIG. 11(*a*) shows a concept of a destination list management table managed in the management system 50*ab*, and FIG. 11(*b*) shows a concept of a destination list management table managed in the management system 50*cd*. In this destination list management table, for terminal ID of terminal 10 submitting a request of the start of communication, all terminal IDs of the terminals 10 registered as the destination candidates capable of communication are associated with the terminal ID of the terminal 10 connected to the own management system 50. For example, in the destination list management table illustrated in FIG. 11(*a*), a destination candidate to which the start of communication in a television conference can be requested from the terminal 10*aa* as a requestor having the terminal ID of "01aa" is the terminal 10*ab* having the terminal ID of "01ab". Note that the destination list management table controls the terminal ID of the terminal 10 connected to other management system 50 as the terminal ID of the terminal 10 of the destination candidate. Consequently, for example, the terminal 10*aa* connected to the management system 50*ab* can select the terminal 10*db* connected to other management system 50*cd* as a destination. This destination candidate is updated by being added or deleted by a request of addition or deletion to the management system 50 from an arbitrary terminal 10.

(Session Management Table)

A session management DB 5005 configured from a session management table illustrated in FIG. 12 is built in the storage unit 5000. Note that FIG. 12(*a*) shows a concept of a session management table managed in the management system 50*ab*, and FIG. 12(*b*) shows a concept of a session management table managed in the management system 50*cd*. In the session management table, for each session ID for identifying a content data session sed between the terminals 10, the relay device ID for identifying the relay device 30 to be used for relaying content data in the content data session sed, and the terminal ID for identifying the terminal 10 which is running communication in the content data session sed, are associated with each other and managed. Note that the session ID may be identification information, for example a meeting ID, a communication ID, and a telephone call ID, which identifies an event such as a meeting, communication, and a telephone Call, which corresponds to the content data session sed. For example, in the session management table illustrated in FIG. 12(*a*), the relay device 30*a* having the relay device ID of "111a" in the content data session sed identified by the session ID of "se01@jp.oo.com" relays content data between the terminals 10*ab* and 10*db*. In the present embodiment, the session ID includes domain information (communication control information) such as "jp.oo.com", which indicates the management system 50 that can control the start or termination of communication in the content data session sed identified by the session ID. Note that, when the session ID is described below, it is simply referred to as "se01" by omitting the domain information of "jp.oo.com", if there are no explicit reasons.

(State Change Management Table)

A state change management DB 5009 configured from a state change management table illustrated in FIG. 13 is built in the storage unit 5000. Note that FIG. 13 shows a concept of a state change management table. In the state change management table of FIG. 13(*a*), the management information transmitted from the terminal 10, state information before change that indicates the state of the terminal 10 before change, and state information after change that indicates the state of the terminal 10 after change are associated with each other and managed. Note that, in the state change management table of FIG. 13(*a*), management information of "Call" indicates that other terminal 10 requests participation to the session when the content data session sed is established between the terminals 10. Also, management information of "Join" indicates that the terminal 10 requests the start of relay of content data. Management information of "Leave" indicates that the terminal 10 requests termination of communication.

If the state of not only a source terminal 10 of the management information but also the state a destination terminal 10 are changed, control based on the management information is performed using the state change management table of FIG. 13(*b*). The state change management table of FIG. 13(*b*) manages the terminal information that indicates a source or a destination of management information by associating with information listed in the state change management table of FIG. 13(*a*). For example, when the management system 50 receives the management information of "Invite", the state of communication of the terminal 10 as the source of management information is changed from "None" to "Inviting", the state of communication of the terminal 10 as the destination is changed from "None" to, "Invited". Note that the management information of "Invite" indicates that the terminal 10 requests the start of communication. The management information of "Ring" indicates that the terminal 10 rings a dial tone in response to the request of the start of communication. The management information of "Accept" indicates that the terminal 10 accepts the start of communication. The state information of "Inviting" indicates that the terminal is requesting the start of communication, and the state information of "Invited" indicates that the terminal is being requested the start of communication.

(Functional Configurations of Management System)

Next, functional configurations of the management system 50 will be described. Note that, hereinafter, in describing the functional configurations of the management system 50, a relation between the functional configurations and principal configuration elements for realizing the functional configurations of the management system 50 from among the configuration elements illustrated in FIG. 5 will also be described.

The transmission/reception unit 51 may be a reception unit, a communication control unit, control request information transmission unit, a start information transmission unit, a state information before change reception unit, and/or a state information after change transmission unit. The transmission/reception unit 51 is realized according to instructions from the CPU 201 and by the network I/F 209 illustrated in FIG. 5. The transmission/reception unit 51 performs transmission/reception of various types of data (or information) to/from other terminal, device or system via the communication network 2. The transmission/reception unit 51 receives a request of the start of communication by receiving the start request information from the terminal 10. Control associated with the start of communication is executed by transmitting relay device connection information for connecting the relay device 30 to the terminal 10. Also, the transmission/reception unit 51 transmits to other management system 50cd the control request information of requesting control associated with the start of communication between the terminals 10. Also, the transmission/reception unit 51 transmits to the terminal 10 operating communication in the session the terminal ID of the terminal 10 to participate in the content data session sed and participation notification (the start information) including the session ID. Also, the transmission/reception unit 51 receives or transmits the state information after change that indicates the state of the terminal 10 after change.

The terminal authentication unit 52 is realized according to instructions from the CPU 201 illustrated in FIG. 5. The terminal authentication unit 52 searches the terminal authentication management table (see FIG. 9) of the storage unit 5000 using the terminal ID and the password as search keys included in the login request information received via the search key transmission/reception unit 51, and performs terminal authentication by determining whether the same terminal ID and the password are managed in the terminal authentication management table.

The state management unit 53 is realized according to instructions from the CPU 201 illustrated in FIG. 5. The state management unit 53 stores and manages the terminal ID of the requestor terminal, the state information indicating the operating state of the requestor terminal, and the IP address of the requestor terminal in the terminal management table (see FIG. 10) in association with each other in order to control the operating state of the requestor terminal that has requested login. The state management unit 53 as an example of a first change processing unit changes the state information managed by the terminal management table when the operating state of the terminal 10 is changed based on control by the own management system 50. The state management unit 53 as an example of a second change processing unit changes the state information managed by the terminal management table based on the state information after change transmitted from another management system 50 when the operating state of the terminal 10 is changed based on control by the another management system 50.

The terminal extraction unit 54 is realized according to instructions from the CPU 201 illustrated in FIG. 5. The terminal extraction unit 54 searches the destination list management table (see FIG. 11) by using the terminal ID of the requestor terminal that has requested login as a key, and extract and reads out a terminal ID of a terminal 10 of a destination candidate. The terminal extraction unit 54 searches the destination management table by using the terminal ID of the requestor terminal that has requested login as a key, and extracts a terminal ID of another requester terminal that registers the terminal ID of the requester terminal as a candidate of the destination terminal.

The state extraction unit 55 is realized according to instructions from the CPU 201 illustrated in FIG. 5. The state extraction unit 55 searches the terminal management table (see FIG. 10) by using the terminal ID of the destination terminal candidate extracted by the terminal extraction unit 54 as a search key, and reads out the operating state for each terminal ID extracted by the terminal extraction unit 54. Consequently, the state extraction unit 55 can extract the operating state of the destination terminal candidate capable of communicating with the requestor terminal that has requested login. In addition, the state extraction unit 55 searches the management table by using the terminal ID extracted by the terminal extraction unit 54 as a search key, and acquires the operating state of the requestor terminal that has requested login.

The communication control determining unit 56 is realized according to instructions from the CPU 201 illustrated in FIG. 5. The communication control determining unit 56 determines whether control associated with the start of communication should be operated or not by the own management system 50 based on the domain information included in the relay device ID selected by the selection device 80.

The session management unit 57 is realized according to instructions from the CPU 201 illustrated in FIG. 5. The session management unit 57 generates a session ID for identifying a content data session sed every time when the content data session sed between the terminals 10 is newly established. The session management unit 57 stores in the session management table (see FIG. 12), the session ID, the terminal ID for identifying the terminal 10 that operates communication in the session, and the relay device ID of the relay device 30 to be used in the session in the session management table (see FIG. 12) in the manner that they are associated with each other.

The storing/readout processing unit 59 is realized according to instructions from the CPU 201 and by the HDD 205 illustrated in FIG. 5. The storing/readout processing unit 59 performs processing of storing various types of data in the storage unit 5000 and reading out of the various types of data stored in the storage unit 5000.

<Functional Configuration of Selection Device>

The selection device 80 includes a transmission/reception unit 81, a selection unit 82, and a storing/readout processing unit 89. These units are configured as the functions or means to function to be realized by operation of any one of the configuration elements illustrated in FIG. 5 according to instructions from the CPU 201 in response to a management system program read from the HD 204 and developed on the RAM 203. The selection device 80 includes a storage unit 8000 built by the HD 204 illustrated in FIG. 5.

(Relay Device Selection Management Table)

A relay device selection management DB 8001 as an example of the communication control information management unit configured from the relay device management table illustrated in FIG. 14 is built in the storage unit 8000. Note that FIG. 14 shows a concept of a relay device selection management table. A relay device ID for identifying the relay device 30 is assigned to all relay devices 30 that are candidates of selection, and managed using the relay device selection management table to select a relay device to be used to relay information transmitted/received between the terminals 10.

The relay device ID managed in the relay device selection management table includes the domain information (communication control information) such as "jp.oo.com", which indicates the management system 50 capable of executing control associated with the start of communication using the relay device 30 identified by the relay device ID. The priority information indicating the priority in selecting the relay device 30 identified by the relay device ID is managed in the relay device selection management table for each terminal ID. The relay device selection management table illustrated in FIG. 14 illustrates that, in a case where the terminal 10aa identified by the terminal ID of "01aa" starts communication, the priority in selecting the relay device 30a identified by the relay device ID of "111a" is "3". Note that a numerical value of the priority in the relay device selection management table is determined so that larger a numerical value is, higher the priority is, based on a bandwidth between the terminal 10 and the relay device 30 and a relay time when information is transmitted/received between the terminal 10 and the relay device 30, for example. Also, the priority may be calculated based on a time zone used by the terminal 10 and the management system 50. In this case, the numerical value of the priority can be set larger if the time zone used by the terminal 10 is closer to the time zone used by the management system 50.

(Functional Configurations of Selection Device)

Next, functional configurations of the selection device 80 will be described. Note that, hereinafter, in describing the functional configurations of the selection device 80, a relation between the functional configurations and principal configuration elements for realizing the functional configurations of the selection device 80 among the configuration elements illustrated in FIG. 5 will be described.

The transmission/reception unit 81 is an example of a selection request information reception unit and an output unit and is realized according to instructions illustrated in FIG. 5 and by the network I/F 209 illustrated in FIG. 5. The transmission/reception unit 81 performs transmission/reception of various types of data (or information) to/from other terminal, device, or system via the communication network 2. Consequently, the transmission/reception unit 81 receives the selection request information indicating a request of selecting the relay device 30 and transmitted from the management system 50. Also, the transmission/reception unit 81 outputs the relay device ID that identifies the relay device 30 selected by the selection device 80 by transmitting the relay device ID to the management system 50.

The selection unit 82 may be an example of a relay device selection unit and a communication control information extraction unit, and selects at least one relay device 30 from a plurality of candidate relay devices 30 based on priority information managed in the relay device selection management table (see FIG. 14). Also, the selection unit 82 extracts the domain information included in the relay device ID by selecting the relay device ID managed in the relay device selection management table.

The storing/readout processing unit 89 is realized according to instructions from the CPU 201 and by the HDD 205 illustrated in FIG. 5. The storing/readout processing unit 89 performs storing of various types of data in the storage unit 8000 and reading out of the various types of data stored in the storage unit 8000.

Processing and Operation of Embodiment

Next, a processing method in the transmission system 1 according to the embodiment will be described.

(Preparation Stage)

Figure 15:
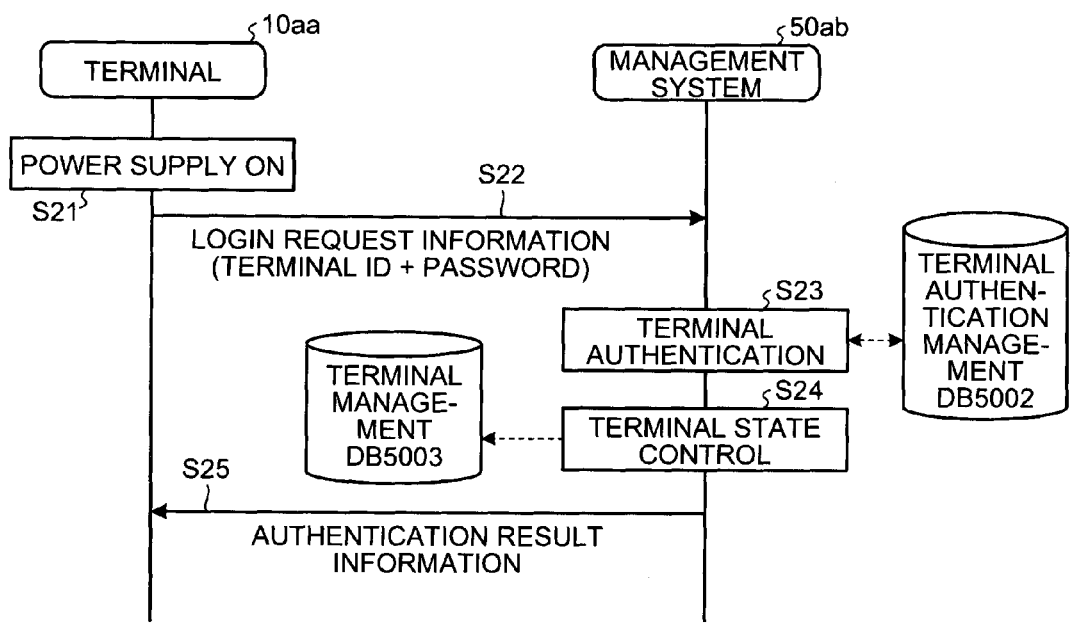
FIG. 15 is a schematic diagram illustrating a sequence of a process prior to the start of communication between the terminals.

First, transmission/reception processing of management information in a preparation stage before the start of communication between the terminal 10aa and other terminals 10 will be described with reference to FIG. 15. FIG. 15 shows a sequence of a preparation stage before the start of communication between terminals. Note that, in FIG. 15, various types of management information are transmitted/received through the management information session sei illustrated in FIG. 2.

First, when a user of the terminal 10aa turns ON the power supply switch 109 illustrated in FIG. 4, the operation input reception unit 12 illustrated in FIG. 6 turns ON the power supply in response to the power supply ON (step S21). Then, the login request unit 13 automatically transmits login request information that indicates a login request to the management system 50ab via the communication network 2 from the transmission/reception unit 11 upon receiving the power supply ON (step S22). The login request information includes a terminal ID for identifying the requestor terminal 10aa and a password. These terminal ID and password are read out from the storage unit 1000 through the storing/readout processing unit 19 and are transmitted to the transmission/reception unit 11.

Next, the terminal authentication unit 52 of the management system 50 searches the terminal authentication management table (see FIG. 9) by using as a search key the terminal ID and the password included in the login request information received through the transmission/reception unit 51, and performs terminal authentication by determining the same terminal ID and password are managed in the terminal authentication management table (step S23). Since the same terminal ID and password are managed by the terminal authentication unit 52, when it is determined that the login request is given from the terminal 10 having valid use authority, the state management unit 53 stores the terminal ID of the terminal 10aa and the state information indicating the operating state in the terminal management table (see FIG. 10) in the manner that they are associated with each other (step S24). Consequently, the state information of "None" and the terminal ID of "01aa" are associated with each other and managed in the terminal management table.

Then, the transmission/reception unit 51 of the management system 50 transmits authentication result information indicating an authentication result obtained by the terminal authentication unit 52 to the requestor terminal 10*aa* that has requested login via the communication network 2 (step S25). In the embodiment described below, it is assumed that the terminal is determined as the valid use authority by the terminal authentication unit 52.

(State Management)

Figure 16:
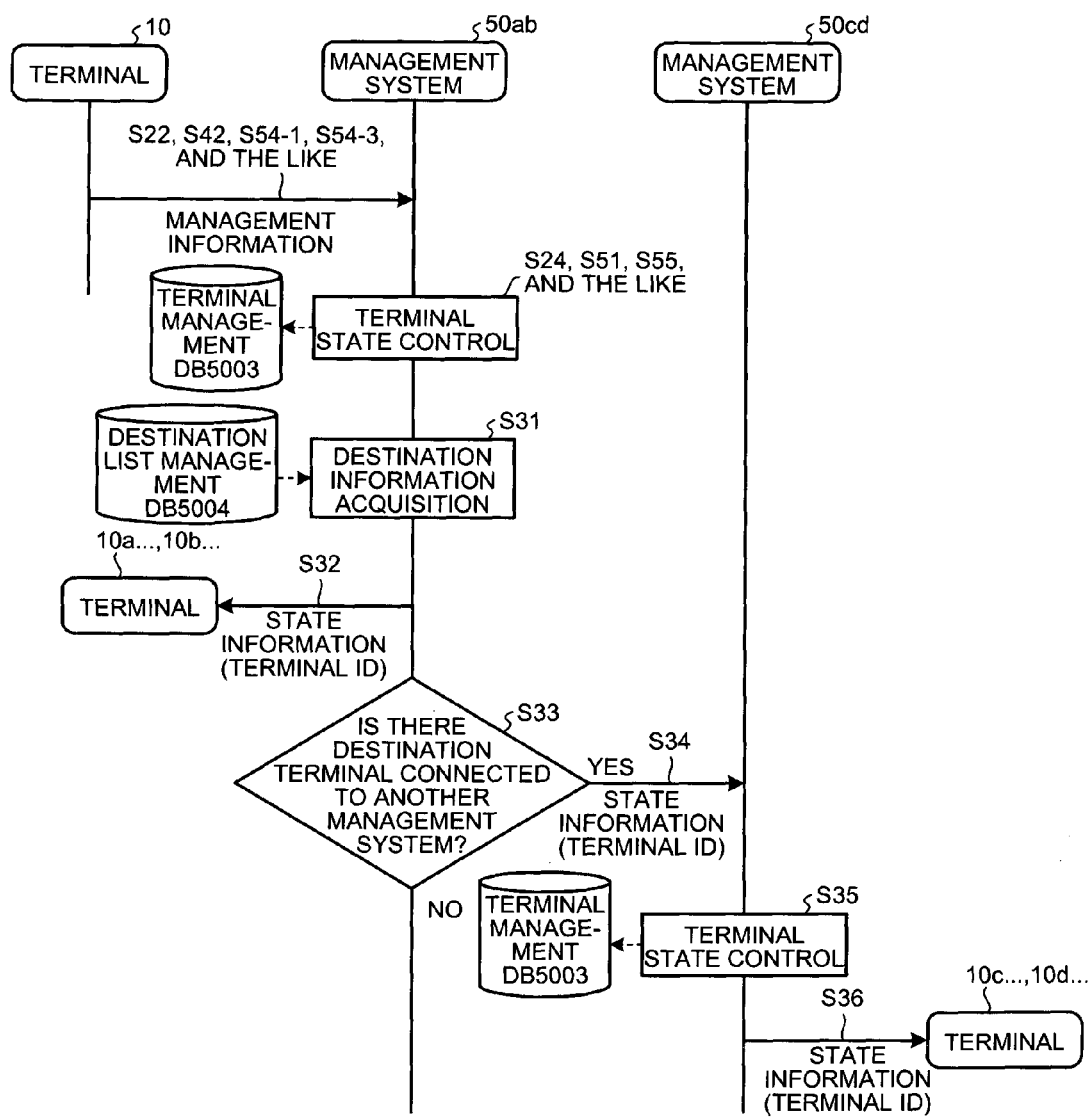
FIG. 16 is a schematic diagram illustrating a sequence of a process of informing a change of a state of the terminals.

When the state of the terminal 10 is changed by control of communication based on the management information transmitted from the terminal 10, the management system 50 that has executed the control manages the state after change and transmits the state to another management system 50. The processing of this time will be described with reference to FIG. 16. FIG. 16 shows a sequence of processing of informing a change of the state. Note that, in FIG. 16, various types of management information are transmitted/received through the management information session sei illustrated in FIG. 2.

When the state information of the terminal 10 managed in the terminal management table is changed (for example, step S24) by control of communication based on the management information (for example, step S22) transmitted from the terminal 10, the terminal extraction unit 54 searches the destination list management table (see FIG. 11) by using the terminal ID of the terminal 10 (here, "01aa"), the state information of which has been changed as a search key (step S31). Consequently, the terminal extraction unit 54 extracts the terminal ID by reading out the terminal IDs of "01ab, 01ba, 01ca, 01cb, and 01db" that is of the terminals capable of communicating with the terminal 10, the state of which has been changed. Next, the transmission/reception unit 51 transmits the terminal ID of the terminal 10*aa* of "01aa" and the state information after change to the terminals (10*ab* and 10*ba*) connected to the management system 50*ab*. Consequently, the terminals (10*ab* and 10*ba*) capable of communicating with the terminal 10*aa* can recognize the state of the terminal 10*aa*.

The transmission/reception unit 51 determines whether there is a destination candidate terminal connected to another management system 50 based on the domain information included in the extracted terminal ID (step S33). In a case where there is a destination candidate terminal connected to another management system 50 (YES at step S33), the transmission/reception unit 51 transmits the terminal ID of the terminal 10*aa* of "01aa", the destination name of "Tokyo office AA terminal", the state information after change, and the terminal IDs of the destination candidate terminals of "01ca, 01cb, and 01db" to the management system 50*cd* based on the domain information of "us.oo.com" included in the extracted terminal ID (step S34). Note that the management system 50*ab* may transmit, Concerning the state information after change of the terminals (10*aa*, 10*aa*, . . . , 10*ba*, 10*bb*, . . . ), the state information after change to the management system 50*cd* only during a temporary period in which the terminals 10 are connected to the own management system 50*ab*. Consequently, the management system 50*cd* can manage the states of the terminals (10*aa*, 10*aa*, . . . , 10*ba*, 10*bb*, . . . ) that are not directly connected to the own management system 50*cd* only during a temporary period, and therefore, the load to the management system 50*cd* can be reduced.

The state management unit 53 of the management system 50*cd* records the received terminal ID of "01aa", the destination name of "Tokyo office AA terminal", and the state information after change associated with each other in the terminal management table (see FIG. 10(*b*)) (step S35). Consequently, the management system 50*cd* can recognize the state of the terminal 10*aa* capable of communicating with the terminals (10*ca*, 10*cb*, and 10*db*) connected to the own management system 50*cd*. The terminal management table of the management system 50*cd* can manage the state of the terminal 10*aa* from the time when the management system 50*cd* receives the state information of "None" of the terminal 10*aa* to the time when the management system 50*cd* receives the state information of "Offline" of the terminal 10*aa* from the management system 50*ab*. Consequently, the terminal 10*aa* that is not directly connected to the management system 50*cd* can be managed only during a temporary period, and therefore the load to the management system 50*cd* can be reduced.

Subsequent to that, the transmission/reception unit 51 of the management system 50*cd* transmits the terminal ID of "01aa@jp.oo.com" and the state information after change of the terminal 10*aa* to the terminals (10*ca*, 10*cb*, and 10*db*). Consequently, the terminals (10*ca*, 10*cb*, and 10*db*) capable of communicating with the terminal 10*aa* can recognize the operating state of the terminal 10*aa*. In the terminal 10 that has received the state information after change, the destination list creation unit 20 displays a destination list box 1100-1 (see FIG. 7) to the display 120, in which the operating state of the terminal 10 is illustrated by an icon 1100-3*a* and the like based on the state information after change. Consequently, the user of the terminal 10 can recognize the operating state of the destination candidate terminal 10. The destination list creation unit 20 displays an icon 1100-4 that indicates a region of the terminal 10 to the display 120 based on the domain information included in the received terminal ID. Consequently, the user of the terminal 10 can recognize the region of the destination candidate terminal 10.

Note that, when the management system 10*cd* changes the state information of the terminal 10, the processing of informing the state information after change to the management system 50*ab* is similar to the above-described processing from steps S31 to S36, and therefore, description is omitted.

(Relay Device Selection Processing)

Figure 17:
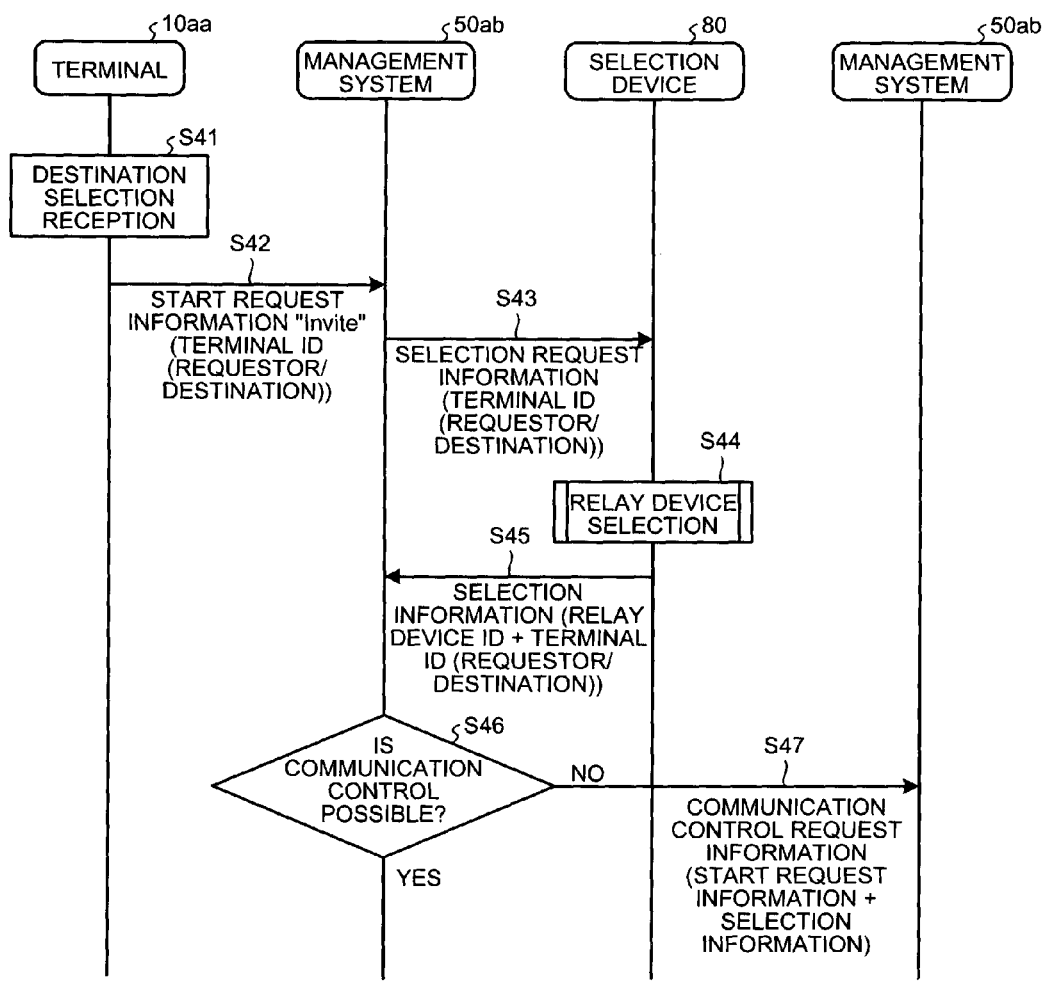
FIG. 17 is a schematic diagram illustrating a sequence of process of selecting a relay device.

Next, processing of selecting a relay device 30 to be used to relay content data transmitted/received between the terminals 10 before starting communication between the terminals 10*aa* and 10*db* will be described with reference to FIG. 17. FIG. 17 shows is a sequence of processing of selecting a relay device. Note that, in FIG. 17, various types of management information are transmitted/received by the management information session sei illustrated in FIG. 2. Also, in the present embodiment, the terminal 10*aa* can request the start of communication by selecting at least one terminal having the operating state of online from between the destination candidate terminals 10.

First, the user of the terminal 10*aa* presses the operation button 108 illustrated in FIG. 3 to select the destination candidate terminal 10*db*, so that the operation input reception unit 12 illustrated in FIG. 6 receives the request of the start of communication (step S41). The transmission/reception unit 11 of the terminal 10*aa* transmits, to the management system 50*ab*, the start request information of "Invite" that indicates the request of the start of communication, and that includes the terminal ID of the terminal 10*aa* of "01aa", which indicates the requestor of the start of communication, and the terminal ID of the terminal 10*db* of "01db", which indicates the destination (step S42). The transmission/reception unit 51 of the management system 50*ab* receives the request of the start of communication of the terminal 10*aa* and the terminal 10*db* by receiving the start request information. Next, the transmission/reception unit 51 transmits to the selection device 80 the selection request information that indicates a request of selecting the relay device 30 to be used to relay content data transmitted/received between the terminal 10*aa* and the terminal 10*db*, and that includes the terminal ID of the terminal 10*aa* of "01aa" and the terminal ID of the terminal 10*db* of "01db" (step S43).

Figure 18:
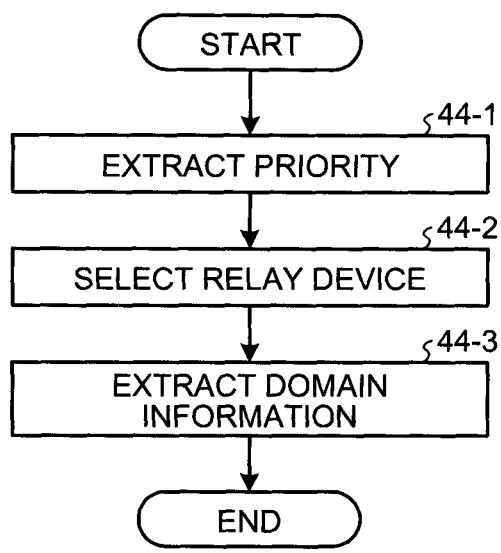
FIG. 18 is a flowchart illustrating a process of selecting the relay device.

The transmission/reception unit 81 of the selection device 80 receives the request of selection of the relay device 30 by receiving the selection request information. Next, the selection unit 82 selects at least one relay device 30 to be used to relay the content data transmitted/received between the terminal 10*aa* and the terminal 10*db* from among the relay devices 30 managed in the relay device selection management table (see FIG. 14) (step S44). The processing of selecting the relay device 30 will be described with reference to FIG. 18. FIG. 18 shows a flowchart of the processing of selecting a relay device.

First, the selection unit 82 extracts the priority associated with the terminal ID of the requestor terminal 10*aa* of "01aa" and the priority associated with the terminal ID of the destination terminal 10*db* of "01db" for each relay device ID managed in the relay device selection management table (see FIG. 14) (step S44-1). Subsequent to that, the selection unit 82 calculates the sum of the numerical number of the priority for each relay device ID and selects the relay device ID of which the sum of the numerical number of the priority is the largest (step S44-2). In the present embodiment, the sum of the numerical number of the priority corresponding to the relay device ID of "111a" and the sum of the numerical number of the priority corresponding to the relay device ID of "111d" are "5" that is the same value. In such a case, the selection unit 82 can arbitrarily select a relay device ID from among the relay device IDs that have the largest sum of the numerical number of the priority in a random or a round robin manner. Note that the selection unit 82 extracts the domain information included in the relay device ID by selecting the relay device ID managed in the relay device selection management table (step S44-3).

When the selection of the relay device 30 is completed, the transmission/reception unit 81 of the selection device 80 outputs selection information that indicates a result of the selection, and that includes the relay device ID identifying the selected relay device, the terminal ID of the terminal 10*aa* of "01aa", and the terminal. ID of the terminal 10*db* of "01db", by transmitting the selection information to the management system 50*ab* (step S45).

The transmission/reception unit 51 of the management system 50*ab* receives the selection result of the relay device 30 by receiving the selection information. Subsequent to that, the communication control determining unit 56 determines whether control associated with the start of communication between the terminals 10 is executed or not using the selected relay device 30 based on the domain information included in the relay device ID of the selection information (step S46). The communication control determining unit 56 of the management system 50*ab* determines that the control is executed if the domain information is "jp.oo.com" that indicates the management system 50*ab*, and determines that the control is not executed if the domain information is not "jp.oo.com." Note that, in the present embodiment, the domain information included in the relay device ID indicates the management system 50 capable of executing control associated with the start of communication. Therefore, in the processing at step S46, when the control is possible, the control is determined to be executed, while when the control is not possible, the control is determined not to be executed. When the control associated with the start of communication is determined not to be executed (NO at step S46), the transmission/reception unit 51 transmits to the management system 50*cd* communication control request information of requesting the control associated with the start of communication based on the domain information of "us.oo.com" (step S47). The communication control request information includes the start request information transmitted from the terminal 10*aa* (see step S42) and the content of the selection information transmitted from the selection device 80 (see step S45).

(Communication Start Processing)

Figure 19:
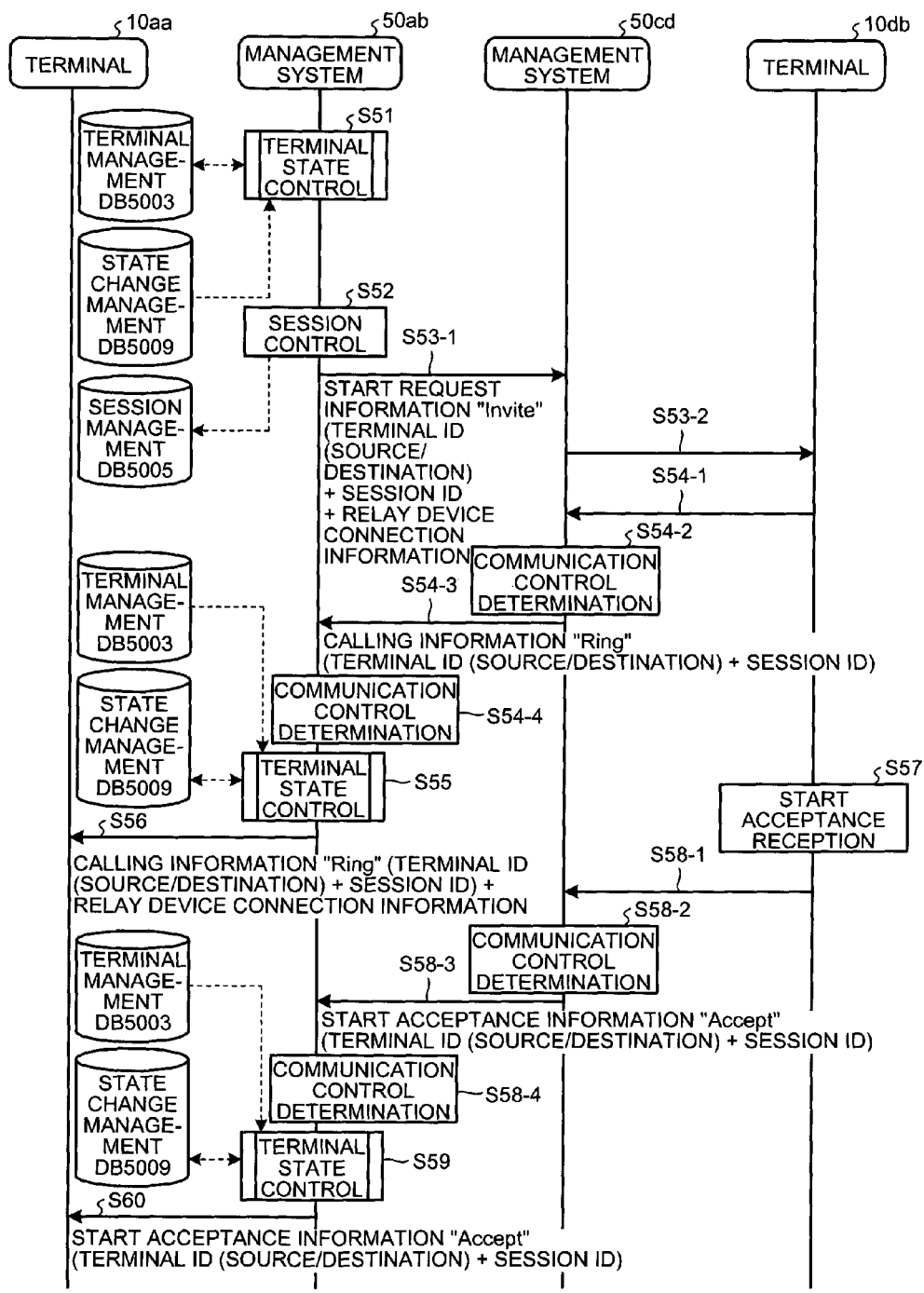
FIG. 19 is a schematic diagram illustrating a sequence of a process for requesting the start of communication between the terminals.

Next, subsequent to processing when the selected relay device 30 is the relay device 30*a* and the control associated with the start of communication is determined to be executed by the management system 50*ab* (YES at step S46) will be described with reference to FIG. 19. FIG. 19 shows a sequence of processing of requesting the start of communication. Note that, in FIG. 19, various types of management information are transmitted/received through the management information session sei illustrated in FIG. 2.

Figure 20:
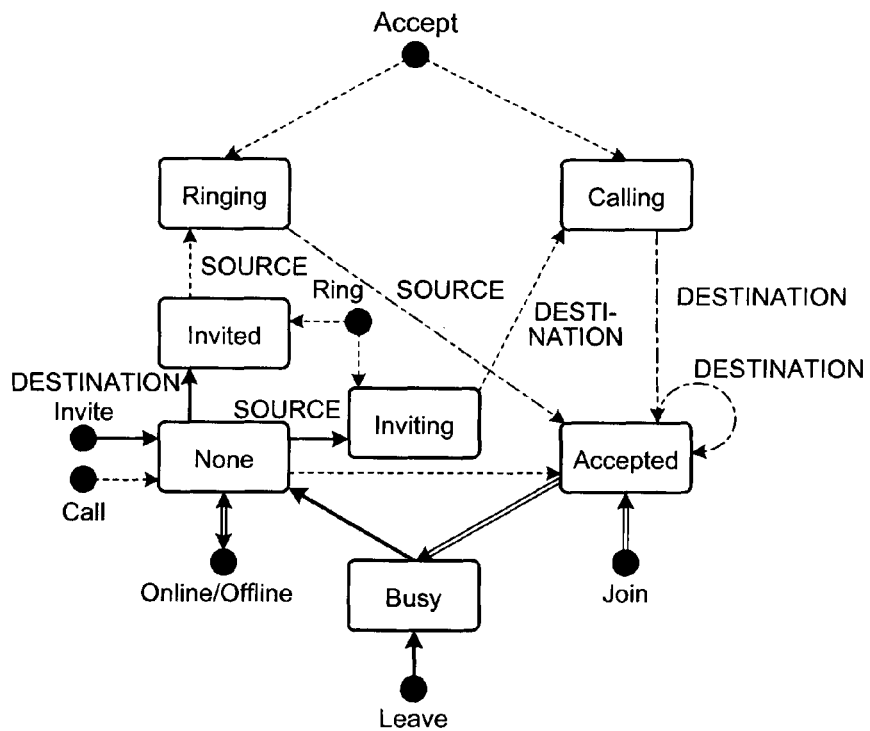
FIG. 20 is a schematic diagram illustrating a state change of the terminals.
Figure 21:
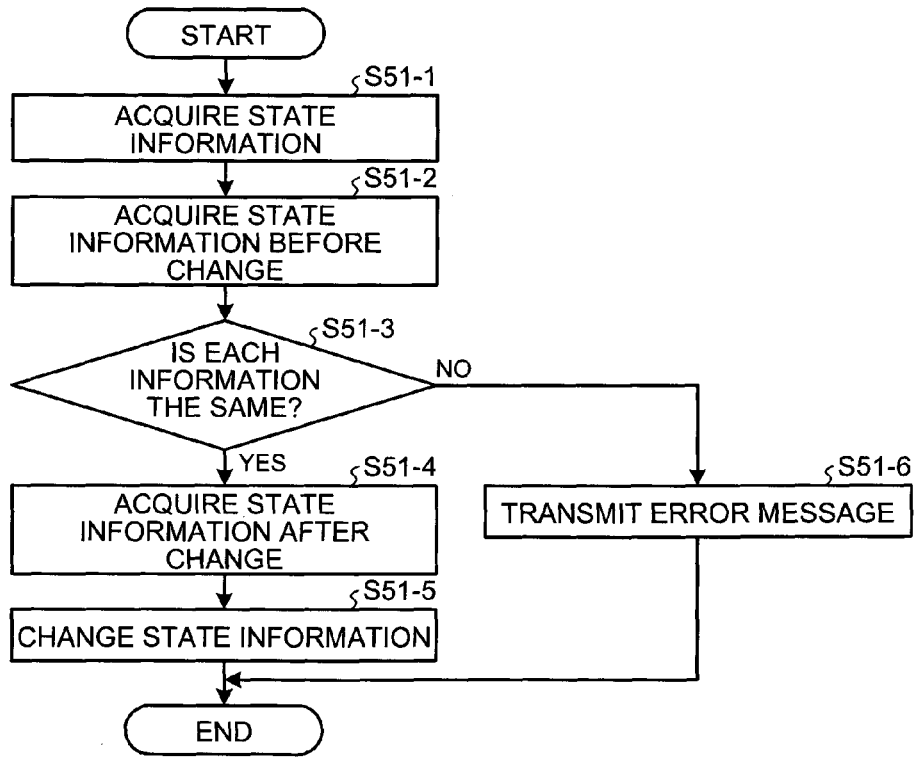
FIG. 21 is a flowchart illustrating a process of the state change of the terminals.

First, the state management unit 53 changes the state information of the source terminal 10*aa* and the destination terminal 10*db* of the start request information managed in the terminal management table (FIG. 10(*a*)) based on the start request information of "Invite" (see step S42) transmitted from the terminal 10*aa* (step S51). Here, processing at step S51 will be described with reference to FIGS. 20 and 21. FIG. 20 is a state transition diagram illustrating a transition of a terminal. FIG. 21 is a flowchart illustrating processing of changing the state of the terminal.

In the present embodiment, the state management unit 53 changes the state of the terminal 10 in accordance with a rule of change of the state illustrated in the state transition diagram of FIG. 20. For example, when the start request information of "Invite" is received from the terminal 10, the state information of the terminal 10 of "None" is changed into the state information of "Inviting" or into the state information of "Invited." Note that, when other management information, such as "Ring, Accept, Join, and Leave", other than "Invite", is transmitted from the terminal 10, the state management unit 53 changes the state of the terminal 10 in accordance with the rule of change of the state illustrated in the state transition diagram of FIG. 20. However, detailed description is omitted. In the present embodiment, an example of using the state change management table (see FIG. 13) is described in order to realize the change of the state by the state management unit 53. However, the method is not limited to the example using the state change management table as long as the state is changed in accordance with the rule illustrated in FIG. 20.

First, the state management unit 53 acquires the state information of "None", which is of terminal 10*aa* as the source of the start request information, and the state information of "None", which is of the destination terminal 10*db* as the destination, from the terminal management table (see FIG. 10(*a*)) (step S51-1). Next, the state management unit 53 acquires the state information before change of "None", which is of the source and destination terminals 10 corresponding to the start request information of "Invite" as the management information (step S51-2). Next, the state management unit 53 compares the state information acquired from the terminal management table and the state information before change acquired from the state change management table (see FIG. 13) for the source terminal 10*aa* and the destination terminal 10*db* respectively, and determines whether these pieces of information are the same or not (step S51-3).

When these pieces of information are determined to be the same (YES at step S51-3), the state management unit 53 acquires the state information after change of "inviting", which is of the source of the change request information of "Invite", and the state information after change of "Invited", which is of the destination of the change request information of "Invite" (step S51-4). Next, the state management unit 53 changes the state information associated with the terminal ID of the source terminal 10*aa* of "01aa" into "Inviting" based on the acquired state information after change in the terminal management table (see FIG. 10(*a*)) (step S51-5). Similarly, the state management unit 53 changes the state information associated with the terminal ID of the destination terminal 10*db* of "01db" into "Invited" based on the acquired state information after change in the terminal management table.

Note that, when the state information of the terminals (10*aa* and 10*db*) is changed (see step S515), the state information ("Inviting" and "Invited") that indicates the states of the changed terminals (10*aa* and 10*db*) are informed to the respective destination terminals 10 based on the processing from steps S31 to S36.

When the information is determined not to be the same in step S51-3, it is considered that any terminal 10 is not in the state of starting communication, and therefore, the state management unit 53 does not execute the processing of changing the states of the terminals 10. In this case, the transmission/reception unit 51 transmits an error message to the terminal 10*aa* and terminates the processing (step S51-6).

When the processing of changing the state information of the terminal 10 is completed, the session management unit 57 generates the session ID of "se01@jp.oo.com" for identifying the content data session sed for executing communication between the terminal 10*aa* and the terminal 10*db* (step S52). Note that, in the present embodiment, since it is determined that the control associated with the start of communication is executed by the management system 50*ab* (see step S46), the session ID is generated including the domain information of "jp.oo.com" that indicates the management system 50*ab*. The session management unit 57 stores in the session management table (see FIG. 12) the generated session ID, the relay device ID of the selected relay device 30*a* of "111a", and the terminal IDs of the terminals (10*aa* and 10*db*) of "01aa and 01db", between which communication starts, in the manner that they are associated with each other.

Next, the transmission/reception unit 51 of the management system 50*ab* transmits the start request information of "Invite" and the session ID of "se01" transmitted from the terminal 10*aa* through the management system 50*cd* at step S42 to the terminal 10*db* (steps S53-1 and S53-2). Note that, in the present embodiment, since the terminal ID includes the domain information, the transmission/reception unit 11 can select directly to transmit the information to the terminal 10 or to transmit the information through another management system 50 to the terminal 10, based on the domain information included in the terminal ID. The start request information includes the terminal ID of "01aa", which is of the terminal 10*aa* as the source of the start request information, and the terminal ID of "01db", which is of the terminal 10*db* as the destination. At this time, the transmission/reception unit 51 of the management system 50*ab* transmits the relay device connection information for connecting the selected relay device 30*a* to the terminal 10*db* through the management system 50*cd*. The relay device connection information includes the relay device ID of the relay device 30*a* of "111a" and the password of "xxxx" for connecting to the relay device 30*a* and managed in the relay device management table (see FIG. 8(*a*)).

The transmission/reception unit 11 of the terminal 10*db* receives a request of the start of communication from the terminal 10*aa* by receiving the start request information. The transmission/reception unit 11 of the terminal 10*db* transmits to the management system 50*ab* through the management system 50*cd* upon receiving the start request information, the calling information of "Ring" that indicates that the request of the start of communication has been received and for ringing a dial tone at the terminal 10*aa* (steps S54-1 and S54-3). The calling information includes the terminal ID of "01db", which is of the terminal 10*db* as the source of the calling information, the terminal ID of "01aa", which is of the terminal 10*aa* as the destination, and the session ID of "se01@jp.oo.com." Note that the calling information transmitted at step S54-1 is received by the transmission/reception unit 51 of the management system 50*cd*. In this case, the communication control determining unit 56 of the management system 50*cd* determines that control of calling associated with the start of communication is not executed by the management system 50*cd* based on the domain information of "jp.oo.com" included in the session ID of the calling information (step S54-2). Consequently, the transmission/reception unit 51 of the management system 50*cd* transfers the calling information to the management system 50*ab* indicated by the domain information of "jp.oo.com.". Similarly, in the management system 50*ab* that has received the calling information, the communication control determining unit 56 determines whether the control of calling associated with the start of communication is executed by the management system 50*ab* based on the domain information of "jp.oo.com" included in the sessions ID (step S54-4). Consequently, the transmission/reception unit 51 of the management system 50*ab* receives a request of ringing the dial tone at the terminal 10*aa*.

Next, the state management unit 53 of the management system 50*ab* changes the state information of the terminal 10*aa* managed in the terminal management table (FIG. 10(*a*)) into "Calling" and the state information of the terminal 10*db* into the "Ringing" based on the calling information of "Ring" transmitted from the terminal 10*db* (step S55). Note that the processing of changing the state information of the terminals (10*aa* and 10*db*) is similar to the processing at step S51, and therefore, detailed description is omitted. The processing of transmitting the state information after change of the changed terminals (10*aa* and 10*db*) to the terminal 10 capable of communicating with the terminals (10*aa* and 10*db*) is the same as the processing in steps S31 to S36, and therefore, detailed description is omitted. However, in searching the destination list Management table (see FIG. 11(*a*)) by using the terminal ID of "01db" as a search key at step S31, the terminal ID of the requestor is extracted as the terminal ID of the communication-capable terminal.

Next, the management system 50*ab* transmits the calling information of "Ring" transmitted from the terminal 10*db* to the terminal 10*aa* (step S56). The calling information includes the terminal ID of "01db", which is of the terminal 10*db* as the source of the calling information, the terminal ID of "01aa", which is of the terminal 10*aa* as the destination, and the session ID. Also, at this time, the transmission/reception unit 51 of the management system 50*ab* transmits the relay device connection information for connecting to the relay device 30a to the terminal 10db. The relay device connection information includes the relay device ID of the relay device 30a of "111a" and the password of "xxxx" for connecting with the relay device 30a and managed in the relay device management table (see FIG. 8(a)).

The transmission/reception unit 11 of the terminal 10aa receives a request of ringing a dial tone in the terminal 10aa by receiving the calling information. Consequently, the audio output unit 15b of the terminal 10aa can ring the dial tone from the speaker 115. Note that, in the present embodiment, the management system 50ab starts control of connection between the terminals 10 when the operating state of the destination terminal 10db is "None" (step S51). However, after the state of the terminal 10db is changed in the management system 50cd until the changed state is transmitted to the management system 50ab, a time lag may occur therebetween. In this case, it may be difficult for the management system 50ab to recognize the state of the terminal 10db in temporally accurate manner. In such a case, when the terminal 10db cannot receive the start request information, the management system 50ab may transmit the start request information. Therefore, in the present embodiment, the management system 50ab controls connection between the terminal 10 after recognizing the fact that the terminal 10db has received the start request information by receiving the calling information.

Meanwhile, in the terminal 10db that has transmitted the calling information, the audio output unit 15b rings a ringtone from the speaker 115. Consequently, the user of the terminal 10db gets to know the request of the start of communication from the terminal 10aa. Simultaneously, the operation button 108 of the terminal 10db receives acceptance of the start of communication with the terminal 10aa (step S57). When the acceptance of the start of communication is received, the start accept information of "Accept" that indicates the acceptance of the start of communication is transmitted to the management system 50ab through the management system 50cd (step S58-1, S58-3). The start accept information includes the terminal ID of "01db", which is of the terminal 10db as the source of the start accept information, the terminal ID of "01aa", which is of the terminal 10aa as the destination, and the session ID of "se01@jp.oo.com." In this case, each communication control determining unit 56 of the management systems (50cd and 50ab) determines whether the control associated with the start of communication is executed by the own management system 50 in a similar manner to the processing of steps S54-2 and S54-4 or not (steps S58-2 and S58-4). Consequently, the transmission/reception unit 51 of the management system 50ab receives the acceptance of the start by the terminal 10db.

Next, the state management unit 53 of the management system 50ab respectively changes the state information of the terminal 10aa managed in the terminal management table (FIG. 10(a)) and the state information of the terminal 10db into "Accepted" based on the start accept information of "Accept" transmitted from the terminal 10db (step S59). Note that the processing of changing the state information of the terminal 10 is similar to the processing at step S51, and therefore, detailed description is omitted.

Next, the management system 50ab transmits the start accept information of "Accept" transmitted from the terminal 10db to the terminal 10aa (step S60). The start accept information includes the terminal ID of "01db", which is of the terminal 10db as the source of the start accept information, the terminal ID of "01aa", which is of the terminal 10aa as the destination, and the session ID.

Figure 22:
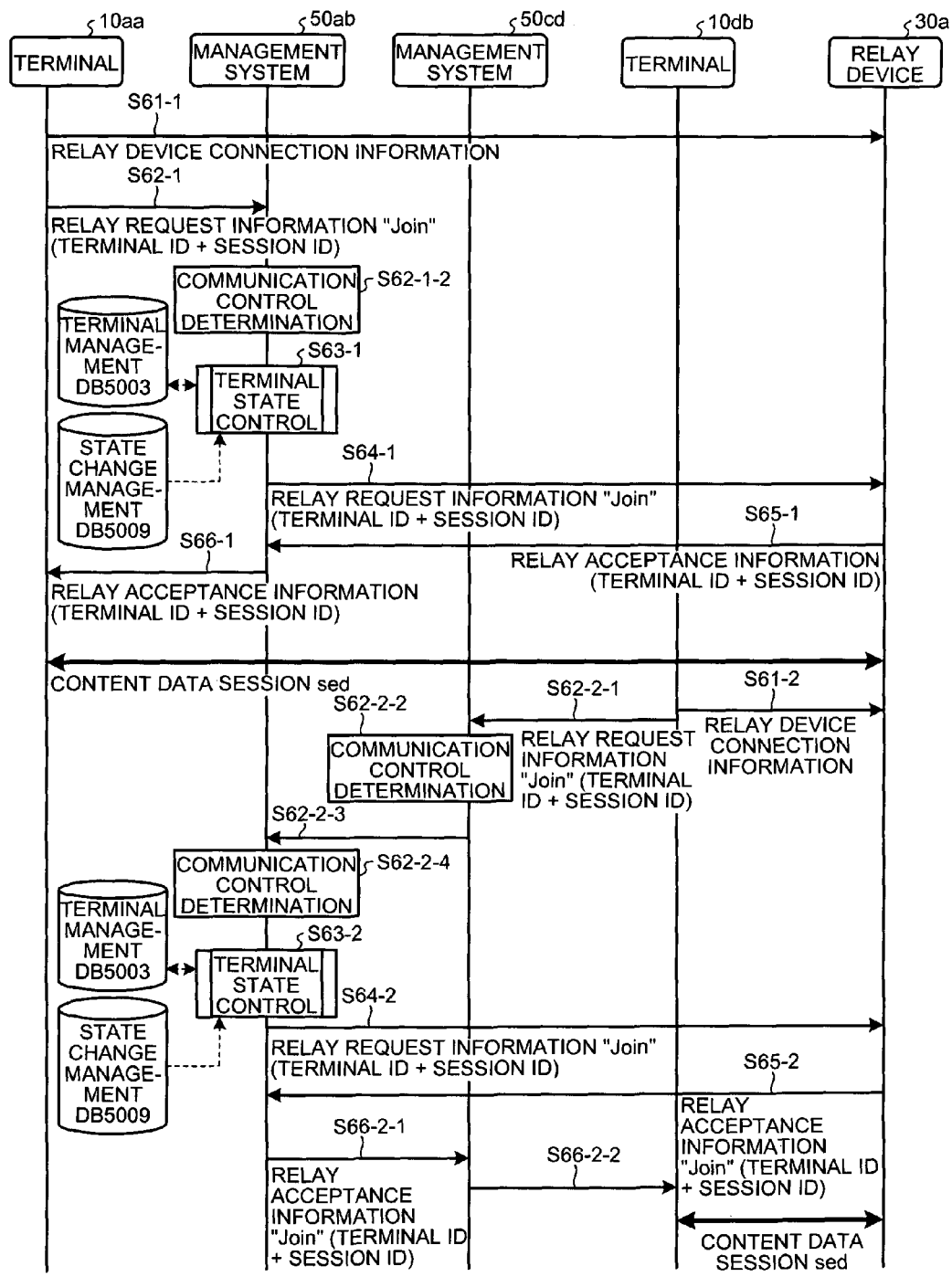
FIG. 22 is a schematic diagram illustrating a sequence of a process for starting communication between terminals.

Next, processing for starting the content data session sed between the terminals (10aa and 10db) using the relay device 30a after the request of the start of communication is accepted will be described with reference to FIG. 22. FIG. 22 shows a sequence of the processing for starting communication between terminals. Note that, in the communication between the terminal 10 and the management system 50 illustrated in FIG. 22, various types of management information are transmitted/received through the management information session sei illustrated in FIG. 2.

First, the terminal 10aa is connected to the relay device 30a based on the relay device connection information received at step S56 (step S61-1). Subsequent to that, the transmission/reception unit 11 of the terminal 10aa transmits the relay request information of "Join" that indicates a request of the start of relay to the management system 50ab (step S62-1). The relay request information includes the terminal ID of the terminal 10aa of "01aa" and the session ID of "se01@jp.oo.com." The communication control determining unit 56 of the management system 50ab determines that the control of the relay request associated with the start of communication is executed by the management system 50ab based on the domain information of "jp.oo.com" included in the session ID of the relay, request information (step S62-1-2). Consequently, the transmission/reception unit 51 of the management system 50ab receives a request of the start of relay by the terminal 10aa.

Next, the state management unit 53 of the management system 50ab changes the state information of the terminal 10aa managed in the terminal management table (FIG. 10(a)) into "Busy" based on the relay request information of "Join" transmitted from the terminal 10aa (step S63-1). Note that the processing of changing the state information of the terminal 10 is similar to the processing at step S51, and therefore, detailed description is omitted.

Next, the transmission/reception unit 51 of the management system 50ab transmits the relay request information including the terminal ID of the terminal 10aa of "01aa" and the session ID of "se01" to the relay device 30a (step S64-1). Upon receiving the relay request information, the transmission/reception unit 31 of the relay device 30a transmits the relay accept information that includes the terminal ID of the terminal 10aa of "01aa" and the session ID of "se01", and that indicates acceptance of the start of relay to the management system 50ab (step S65-1). The transmission/reception unit 51 of the management system 50ab transmits the received relay accept information to the terminal 10aa (step S66-1). Consequently, the content data session sed between the terminal 10aa and the relay device 30a is established.

Meanwhile, the terminal 10db connects to the relay device 30a based on the relay device connection information received at step S56 (step S61-2). Subsequent to that, the transmission/reception unit 11 of the terminal 10db transmits the relay request information of "Join" that indicates a request of the start of relay to the management system 50ab through the Management system 50cd (steps S62-2-1 and S62-2-3). The relay request information includes the terminal ID of the terminal 10db of "01db" and the session ID of "se01@jp.oo.com." In this case, each communication control determining unit 56 of the management systems (50db and 50ab) determines whether the control associated with the start of communication is executed by the own management system 50 in a similar manner to the processing of steps S54-2 and S54-4 or not (steps S62-2-2 and S62-2-4). Consequently, the transmission/reception unit 51 of the management system 50ab receives a request of the start of relay by the terminal 10aa.

Next, the state management unit 53 of the management system 50ab changes the state information of the terminal 10db managed in the terminal management table (FIG. 10(a)) into "Busy" based on the relay request information of "Join" transmitted from the terminal 10db (step S63-2). Note that the processing of changing the state information of the terminal 10 is similar to the processing at step S51, and therefore, detailed description is omitted.

Subsequent to that, the transmission/reception unit 51 of the management system 50ab transmits the relay request information including the terminal ID of the terminal 10db of "01db" and the session ID of "se01" to the relay device 30a (step S64-2). Upon receiving the relay request information, the relay device 30a transmits to the management system 50ab the relay accept information that indicates acceptance of the start of relay and includes the terminal ID of the terminal 10db of "01db" and the session ID of "se01" (step S65-2). The transmission/reception unit 51 of the management system 50ab transmits the received relay accept information to the terminal 10db through the management system 50cd (steps S66-2-1 and S66-2-2). Consequently, the content data session sed between the terminal 10db and the relay device 30a is established. When the content data session sed is established, the relay device 30a relays the content data that includes image data and audio data transmitted from one terminal (10aa or 10db) to the other terminal, so that a television conference can be started.

(Participation)

Figure 23:
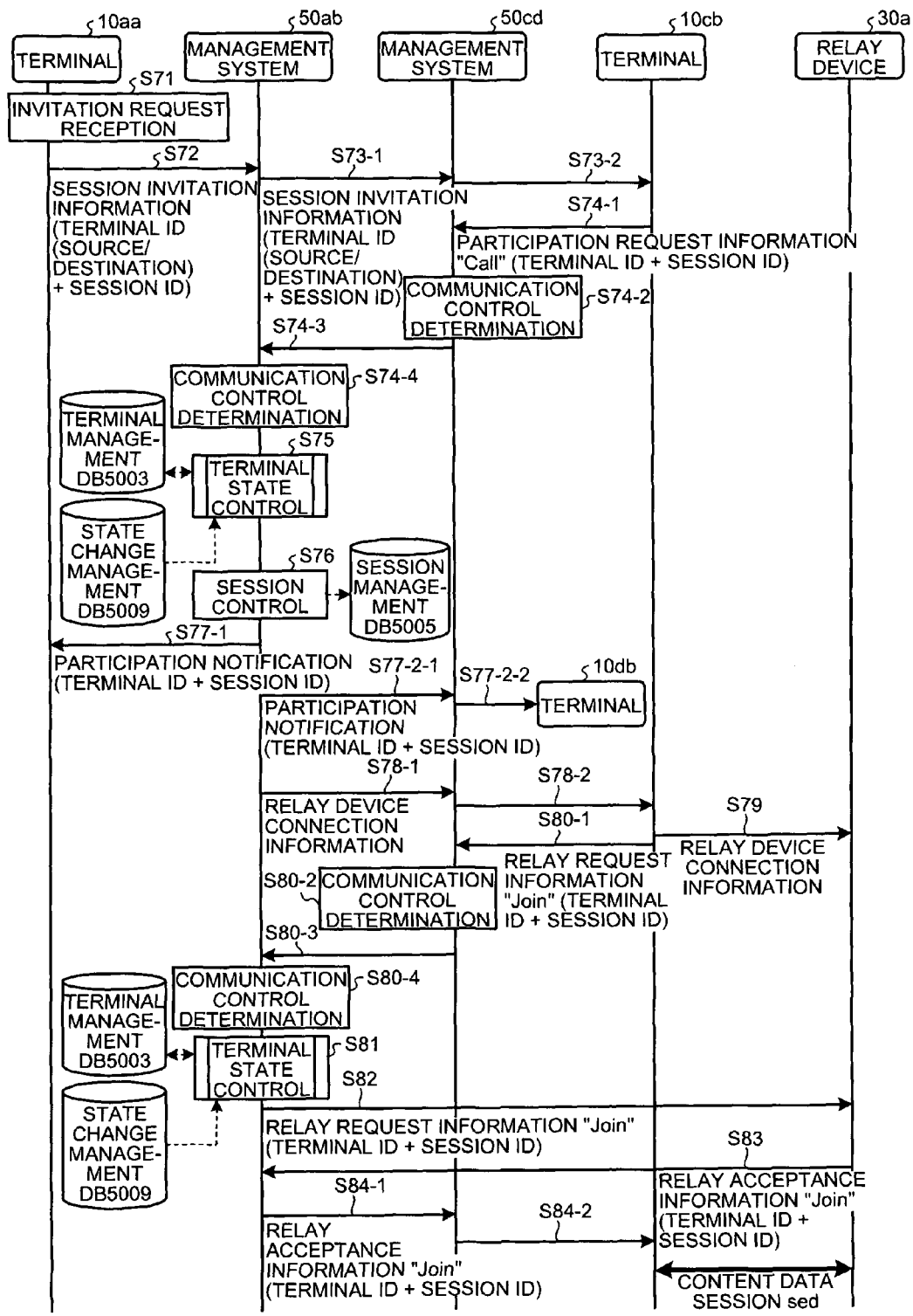
FIG. 23 is a schematic diagram illustrating a sequence of a process for starting communications among three terminals.

Next, processing of executing communication among three terminals 10 by terminal 10cb participating in the content data session sed after the content data session sed is established between the terminal 10aa and the terminal 10db will be described with reference to FIG. 23. Note that FIG. 23 shows a sequence of processing for starting communication among three terminals. Note that, in the communication between the terminal 10 and the management system 50 illustrated in FIG. 23, various types of management information are transmitted/received through the management information session sei.

First, the user of the terminal 10aa under communication with the terminal 10db presses the operation button 108 illustrated in FIG. 3, so that the operation input reception unit 12 receives a request of inviting the terminal 10cb to the session under communication (step S71). Next, the transmission/reception unit 11 of the terminal 10aa transmit to the management system 50ab the session invitation information that indicates invitation to the session, and that includes the terminal ID of the terminal 10aa of "01aa", the terminal ID of the terminal 10cb of "01cb", and the session ID of "se01" (step S72). Note that the session ID may be identification information, for example a meeting ID, a communication ID, and a telephone call ID, which identifies an event, for example a meeting, communication, and a telephone call, corresponding to the content data session sed. The transmission/reception unit 51 of the management system 50ab transmits the received session invitation information to the terminal 10cb through the management system 50cd (steps S73-1 and S73-2).

The transmission/reception unit 11 of the terminal 10cb transmits to the management system 50ab through the management system 50cd in response to the invitation, the participation request information of "Call" that indicates a request of participation to the session (steps S74-1 and S74-3). The participation request information includes the terminal ID of "01cb", which is of the terminal 10cb that requests participation to the session, and the session ID of "se01@jp.oo.com." In this case, each communication control determining unit 56 of the management systems (50db and 50ab) determines whether the control associated with the start of communication is executed by the own management system 50 in the similar manner to the processing of steps S54-2 and S54-4 or not (steps S74-2 and S74-4). Consequently, the transmission/reception unit 51 of the management system 50ab can receive the request of participation to the content data session sed from the terminal 10cb.

Next, the state management unit 53 of the management system 50ab changes the state information of the terminal 10cb managed in the terminal management table (FIG. 10(a)) into "Accepted" based on the participation request information of "Call" transmitted from the terminal 10cb (step S75). Note that the processing of changing the state information of the terminal 10 is similar to the processing at step S51, and therefore, detailed description is omitted.

Next, the session management unit 57 adds the terminal ID of "01cb", which is of the terminal 10cb that requests participation, to a field part of the destination terminal of a record including the session ID of "se01" in the session management table (see FIG. 12) (step S76). Next, the transmission/reception unit 51 of the management system 50ab transmits the terminal ID of "01cb", which is of the terminal 10cb that participates in the content data session sed, and the participation notice that includes the session ID of "se01" to the terminal 10aa and the terminal 10db that are executing communication in the session (steps S77-1, S77-2-1, and S77-2-2). Consequently, the terminal 10aa and the terminal 10db can recognize the terminal 10cb participates in the content data session sed.

Further, the transmission/reception unit 51 of the management system 50ab transmits the relay device connection information for connecting with the relay device 30a that relays content data in this session to the terminal 10cb through the management system 50cd. The relay device connection information includes the relay device ID of the relay device 30a of "111a" and the password of "xxxx" for connecting to the relay device 30a managed in the relay device management table (see FIG. 8(a)) (steps S78-1 and S78-2).

Subsequent to that, the content data session sed between the terminal 10cb and the relay device 30a is established by similar processing to steps S61-2 to S66-2-2 (steps S79 to S84-2). When the session is established, the relay device 30a can relay content data from among the terminals (10aa, 10cb, and 10db). Consequently, the terminals (10aa, 10cb, and 10db) can start a television conference.

(Termination)

Figure 24:
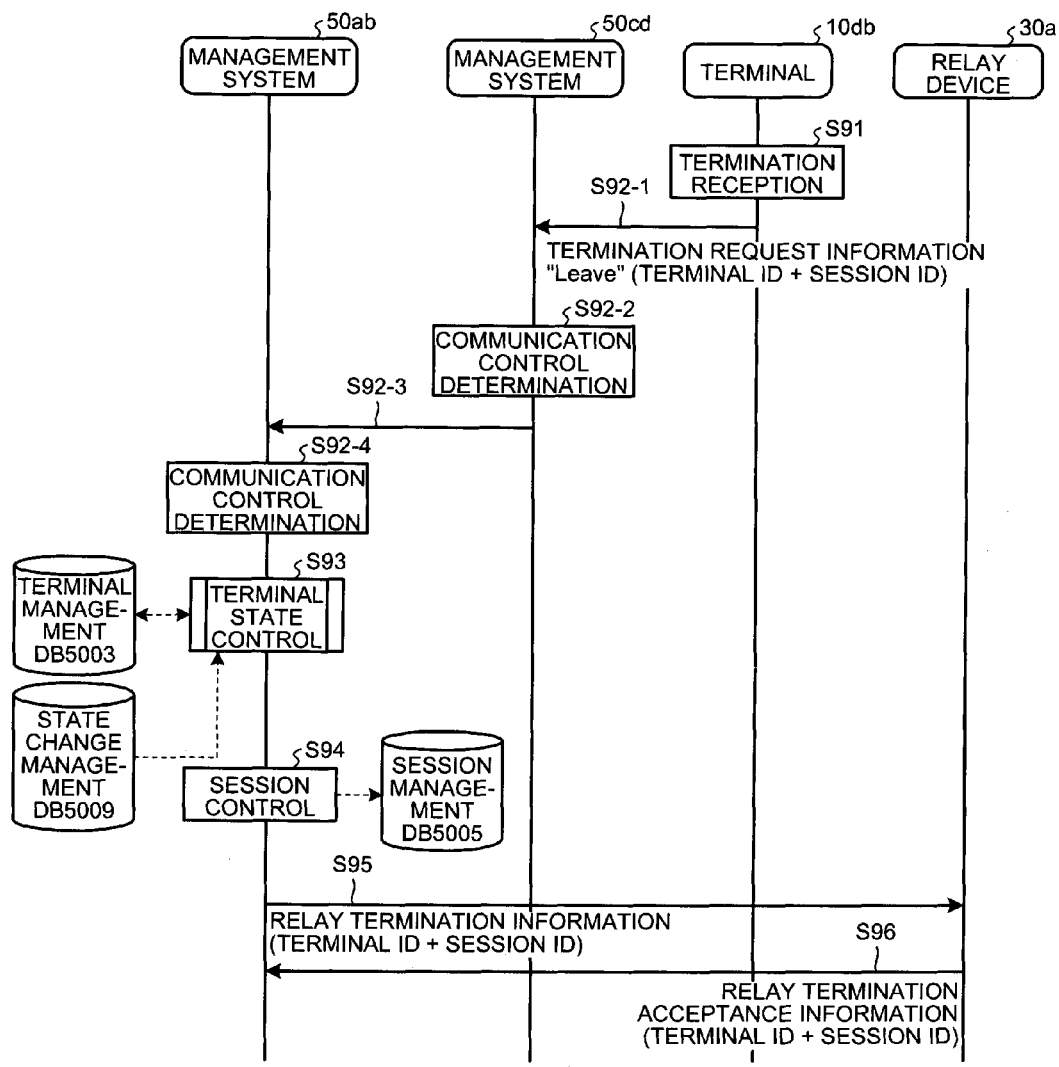
FIG. 24 is a sequence schematic diagram illustrating a sequence of a process for terminating communication.

Next, processing of terminating communication by the terminal 10db to leave the content data session sed after the content data session sed is established among the terminals (10aa, 10ab, and 10db) will be described with reference to FIG. 24. FIG. 24 shows a sequence of processing of terminating communication. Note that FIG. 24 illustrates processing of transmitting/receiving various types of management information through the management information session sei.

First, the user of the terminal 10db presses the operation button 108 illustrated in FIG. 4, so that a request of terminating communication is received (step S91). Then, the transmission/reception unit 11 of the terminal 10db transmits the termination request information of "Leave" including the terminal ID of the terminal 10db of "01db" and the session ID of "se01@jp.oo.com", which identifies the content data session sed used in the communication, to the management system 50ab through the management system 50cd (steps S92-1 and S92-3). In this case, each communication control determining unit 56 of the management systems (50*db* and 50*ab*) determines whether the control associated with termination of communication is executed in the own management system 50 in a similar manner to the processing of steps S54-2 and S54-4 or not (step S92-2, S92-4). Consequently, the transmission/reception unit 51 of the management system 50*ab* can receive the request of termination from the terminal 10*db*.

Subsequent to that, the state management unit 53 of the management system 50*ab* changes the state information of the terminal 10*db* managed in the terminal management table (FIG. 10(*a*)) into "None" based on the participation request information of "Leave" transmitted from the terminal 10*db* (step S93). Note that the processing of changing the state information of the terminal 10 is similar to the processing at step S51, and therefore, detailed description is omitted.

Next, the session management unit 57 deletes the terminal ID of the terminal 10*db* of "01db" from the field part of the terminal ID of the record including the session ID of "se01" in the session management table (see FIG. 12) (step S94). The transmission/reception unit 51 transmits the relay termination information that includes the terminal ID of the terminal 10*db* of "01db" and the session ID of "se01" and that indicates termination of relay to the relay device 30*a* (step S95). Next, the relay device 30*a* transmits the relay termination accept information that includes the terminal ID of "01db" and the session ID of "se01" and that indicates acceptance of termination of relay to the management system 50*ab* (step S96). Accordingly, the relay device 30*a* can stop the relay of the content data transmitted from the terminal 10*db* to the terminals (10*aa* and 10*ab*) and the relay of the content data transmitted from the terminals (10*aa* and 10*ab*) to the terminal 10*db* (step S96). Consequently, the terminal 10*db* can terminate the communication between the terminals (10*aa* and 10*db*) and leave the content data session sed.

Supplement of Embodiment

The management system 50, the selection device 80, and the program providing system 90 in the above-described, embodiment may be implemented by a single computer, or may be implemented by a plurality of computers to which units (functions or means) are arbitrarily divided and allocated. Also, when the program providing system 90 is implemented by a single computer, the program may be transmitted by the Program providing system 90 with divided into a plurality of modules, or may be transmitted by the program providing system 90 without divided. When the program providing system 90 is implemented by the plurality of computers, the program may be transmitted from each computer that transmits a part of the plurality of modules.

In the above-described embodiment, an example has been illustrated in which there is one selection device 80. However, the transmission system may have a plurality of selection devices 80 that have similar function. In this case, each selection device 80 can be provided in the same region as each management system 50, for example. In addition, each function of the selection device 80 may be realized with the management system 50 by reading the selection device program being installed into the management system 50. Note that, in this case, a relay device selection management DB implemented by the relay device selection management table illustrated in FIG. 14 is built in the storage unit 500 of the management system 50.

When the selection device program, the terminal program, the relay device program, and/or the transmission management program are provided to the user as a program product inside and/or outside the country, any type of a recording medium in which these programs are stored, the HD 204 in which these programs are stored, and the program providing system 90 provided with the HD 204 may be used.

In the above-described embodiment, a fully qualified domain name (FQDN) may be managed as the domain information. In this case, an IP address corresponding to the FQDN is obtained by a known domain name system (DNS) server. Note that the IDs, such as the terminal ID and the relay device ID, may be expressed such that "relay device connection destination information that indicates a connection destination to the relay device 30 in the communication network 2", "relay device destination information that indicates a destination to the relay device 30 in the communication network 2", "terminal connection destination information that indicates a connection destination to the terminal 10 in the communication network 2", and "terminal destination information that indicates a destination to the terminal 10 in the communication network 2."

The "television conference" is used as a term replaceable with "video conference" in the embodiment. Also, although a case of a television conference system has been described as an example of the transmission system 1 in the above-described embodiment, the inventions not limited to the embodiment. An internet telephone, for example internet protocol (IP) telephone or a telephone system, may be within a scope of the invention. The transmission system 1 may be a car navigation system. In this case, for example, one terminal 10 corresponds to a car navigation device mounted on an automobile, and the other terminal 10 corresponds to a management terminal of a management center that manages the car navigation, a management server, or to a car navigation device mounted on another automobile. The transmission system 1 may be an audio teleconference, or a personal computer (PC) screen sharing system.

Figure 25:
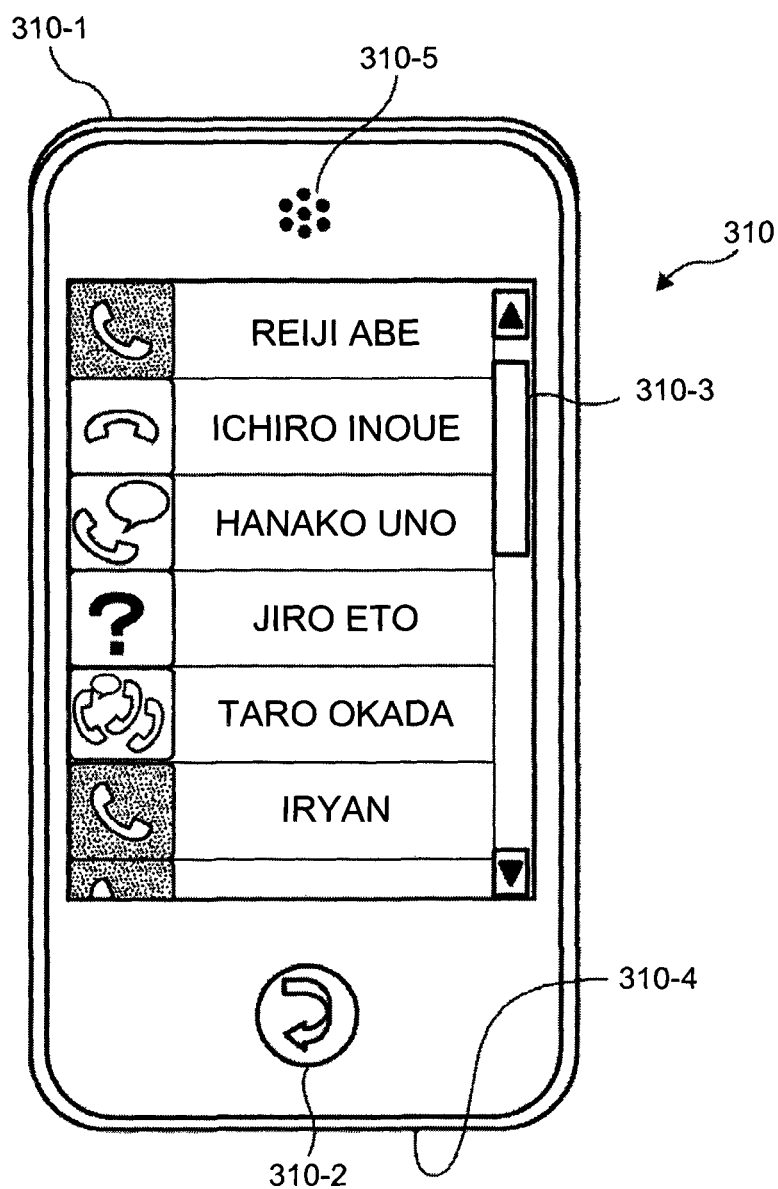
FIG. 25 is a schematic diagram illustrating a concept of a destination list of according to alternative embodiment of the invention.

The transmission system 1 may be a communication system of mobile phone device. In this case, the terminal corresponds to a mobile phone device, for example. A display example of a destination list in this case is illustrated in FIG. 25. FIG. 25 shows a concept of a destination list of another embodiment. That is, a terminal 310 as the mobile phone device includes a main body 310-1 of the mobile phone device, a menu screen display button 310-2 provided in the main body 310-1, a display unit 310-3 provided in the main body 310-1, a microphone 310-4 provided in a lower portion of the main body 310-1, and a speaker 310-5 provided in the main body 310-1. Among them, the "menu screen display button" 310-2 is a button for displaying a menu screen on which icons that indicate various applications are displayed. The display unit 310-3 may be a touch panel. The user can communicate with another mobile phone device by selecting a destination name on the touch panel of his/her own mobile phone device.

Although, in the above-described embodiment, a case of conducting a television conference by the transmission system 1 has been described, the invention is not limited to the embodiment. The invention may be applied to a system of a meeting or a general conversation among families and friends, or may be applied to one-way information providing system.

Principal Effect of Embodiment

As describe above, according to the present invention, when the terminals (10*aa* and 10*db*) are operating the communication via the content data session sed, the transmission/reception unit 51 of the management system 50cd receives the participation request information that includes the terminal ID of the terminal 10cb of "01cb", which requires participation to the session, and the session ID of "se01@jp.oo.com". In this case, advantageously the control associated with the start of communication among the terminals (10aa and 10db) and the terminal 10cd can be executed either by the management system 50ab or by the management system 50cd based on the domain information of "jp.oo.com" included in the session ID of the participation request information.

Also, according to the present embodiment, the transmission/reception unit 51 of the management system 50ab transmits, to the terminal 10cb through the management system 50cd, the relay device connection information for connecting to the relay device 30a that relays the content data in the session. Consequently, the control associated with the start of communication of the terminal 10cb that participates in the content data session sed can be performed.

The transmission/reception unit 51 of the management system 50ab transmits the participation notification that includes the terminal ID of the terminal 10cb of "01cb", which participates in the content data session sed, and the session ID of "se01" to the terminal 10aa and the terminal 10db that are performing the communication in the session. Consequently, the terminal. 10aa and the terminal 10db can recognize that the terminal 10cb participates in the content data session sed.

The transmission/reception unit 11 of the terminal 10cb transmits the participation request information that includes the session ID of "se01@jp.oo.com" to the management system 50ab (steps S74-1 and S74-3). In this case, since the session ID includes the domain information, the terminal 10cb can transmit the participation request information through the management system 50ab.

The invention claimed is:

1. A transmission management system comprising:
   processing circuitry configured to
      receive a request from a second transmission terminal for a start of communication between a first transmission terminal and the second transmission terminal via a communication network, the request including domain information identifying a transmission management system capable of executing control associated with the start of communication using a selected relay device for relaying a communication between the first transmission terminal and a transmission terminal
      determine whether the present transmission management system is configured to control the selected relay device,
      when it is determined that the present transmission management system is configured to control the selected relay device, execute control of the selected relay device for the communication between the first transmission terminal and the second transmission terminal, and
      when it is determined that the present transmission management system is not configured to control the selected relay device, transmit control request information indicating a request of the control to another transmission management system that is configured to control the selected relay device.

2. The transmission management system set forth in claim 1, further comprising:
   the processing circuitry being further configured to determine whether the relay device can be controlled by the present transmission management system based on location information of the relay device within the communication network.

3. The transmission management system set forth in claim 1,
   wherein the processing circuitry is configured to transmit, to the second transmission terminal, relay device connection information for connecting to the selected relay device when it is determined that the present transmission management system is configured to control the selected relay device.

4. The transmission management system set forth in claim 1,
   wherein the processing circuitry is configured to transmit start information, indicating that communication between the first transmission terminal and the second transmission terminal is started, to the first transmission terminal when it is determined that the present transmission management system is configured to control the selected relay device.

5. A transmission system comprising:
   the transmission management system set forth in claim 1; and
   the first transmission terminal and the second transmission terminal.

6. A method, implemented by a transmission management system, comprising:
   receiving a request from a second transmission terminal for a start of communication between a first transmission terminal and the second transmission terminal via a communication network, the request including domain information identifying a transmission management system capable of executing control associated with the start of communication using a selected relay device for relaying a communication between the first transmission terminal and a transmission terminal;
   determining whether the present transmission management system is configured to control the selected relay device;
   when it is determined that the present transmission management system is configured to control the selected relay device, executing control of the selected relay device for the communication between the first transmission terminal and the second transmission terminal, and
   when it is determined that the present transmission management system is not configured to control the selected relay device, transmitting control request information indicating a request of the control to another transmission management system that is configured to control the selected relay device.

7. A non-transitory computer-readable recording medium for storing therein a computer program that includes instructions which when executed on a transmission management system, causes the transmission management system to execute a method comprising:
   receiving a request from a second transmission terminal for a start of communication between a first transmission terminal and the second transmission terminal via a communication network, the request including domain information identifying a transmission management system capable of executing control associated with the start of communication using a selected relay device for relaying a communication between the first transmission terminal and a transmission terminal;

determining whether the present transmission management system is configured to control the selected relay device;

when it is determined that the present transmission management system is configured to control the selected relay device, executing control of the selected relay device for the communication between the first transmission terminal and the second transmission terminal, and when it is determined that the present transmission management system is not configured to control the selected relay device, transmitting control request information indicating a request of the control to another transmission management system that is configured to control the selected relay device.

* * * * *